(12) United States Patent
Berry et al.

(10) Patent No.: US 8,428,870 B2
(45) Date of Patent: Apr. 23, 2013

(54) MODULE SUPPLY CHAIN

(76) Inventors: Allen L. Berry, Houston, TX (US);
Kenneth J. Luhan, Corpus Christi, TX (US)

( * ) Notice: Subject to any disclaimer, the term of this patent is extended or adjusted under 35 U.S.C. 154(b) by 0 days.

(21) Appl. No.: 13/334,954

(22) Filed: Dec. 22, 2011

(65) Prior Publication Data

US 2012/0179624 A1 Jul. 12, 2012

Related U.S. Application Data

(62) Division of application No. 12/572,655, filed on Oct. 2, 2009.

(60) Provisional application No. 61/102,130, filed on Oct. 2, 2008.

(51) Int. Cl.
*G01C 21/00* (2006.01)
*G06Q 30/00* (2012.01)

(52) U.S. Cl.
USPC .................. 701/410; 705/332; 705/338

(58) Field of Classification Search .......... 701/400–541; 455/456.1; 700/28; 707/912, 918, 919, 920; 709/208–219; 705/1.1, 330, 331, 332, 333, 705/336, 337, 338, 417, 418, 7.11, 7.12
See application file for complete search history.

(56) References Cited

U.S. PATENT DOCUMENTS

| | | |
|---|---|---|
| 3,274,745 A | 9/1966 | McManus et al. |
| 3,953,298 A | 4/1976 | Hogan |
| 4,039,130 A | 8/1977 | Hogan |
| 4,951,575 A | 8/1990 | Dominguez et al. |
| 4,983,259 A | 1/1991 | Duncan et al. |
| 5,316,743 A | 5/1994 | LeBlanc et al. |
| 6,112,188 A | 8/2000 | Hartnett |
| 6,139,248 A | 10/2000 | Bentgen et al. |
| 6,807,481 B1* | 10/2004 | Gastelum ...................... 701/410 |
| 7,080,057 B2 | 7/2006 | Scarborough et al. |
| 7,136,830 B1 | 11/2006 | Kuelbs et al. |
| 7,346,530 B2 | 3/2008 | Jones et al. |
| 7,389,239 B1 | 6/2008 | Frank et al. |
| 7,389,261 B1 | 6/2008 | Kumar et al. |
| 7,941,158 B2* | 5/2011 | Olson ........................ 455/456.1 |
| 8,224,758 B2* | 7/2012 | Humprecht et al. .......... 705/332 |
| 2002/0069210 A1 | 6/2002 | Navani et al. |
| 2003/0052797 A1* | 3/2003 | Rock et al. ................... 340/936 |
| 2006/0157275 A1 | 7/2006 | Kadaster et al. |
| 2007/0103342 A1* | 5/2007 | Milleville ..................... 340/988 |
| 2007/0136079 A1 | 6/2007 | Beykirch et al. |

(Continued)

FOREIGN PATENT DOCUMENTS

| | | |
|---|---|---|
| WO | WO03031012 A1 | 4/2003 |
| WO | PCTUS0959373 | 1/2010 |

OTHER PUBLICATIONS

Bruns, "Anything but provincial . . . ", www.siteselection.com/features/2007/sep/canada2007, Site Section Magazine, 2007 (7 pages).

(Continued)

*Primary Examiner* — Igor Borissov
(74) *Attorney, Agent, or Firm* — Cox Smith Matthews Incorporated

(57) ABSTRACT

A system and method of fabricating and assembling of large-sized modules remote from a heavy industrial hydrocarbon processing plant site, and overland transportation thereof to the plant site. The method may rely on a computer-based heavy-haul transportation logistics system.

10 Claims, 23 Drawing Sheets

U.S. PATENT DOCUMENTS

2007/0219468 A1* 9/2007 Shah et al. ............... 600/587
2008/0114612 A1* 5/2008 Needham et al. ........... 705/1
2008/0255754 A1* 10/2008 Pinto ........................ 701/119

OTHER PUBLICATIONS

Cox, "Canada drips with oil, but it's tough to get it", USA Today, www.usatoday.com/money/industries/energy/2004-09-07-oil, Sep. 7, 2004 (4 pages).
Willsbros Canada, www.willbroscanada.com/divisions3.htm, "Edmonton Modular Fabrication Facility", webpage accessed Jun. 20, 2008 (1 page).
PCL Construction Leaders, "UE-1 Piperack Modular Fabrication", www.industrial.pci.com/projects/Archived/1700515/index.aspx, webpage accessed Jun. 20, 2008 (1 page).
Oil Shale & Tar Sands Programmatic EIS Information Center, "About Tar Sands", http://ostseis.anl.gov/guide/tarsands/index.cfm, webpage accessed Jun. 23, 2008 (3 pages).
Sheuerle, Euro Combi-Inter Combi-Flat Combi, http://www.scheuerle.de/EN/branches/haulers1.php?en_fahzeug, webpage accessed Jun. 23, 2008 (1 page).
ASHCO International Refinery (Joint Venture) International Refinery Group, "Humanitarian Worldwide Development Trust Foundation and PETROTEC," Construction Below Petroleum Refinery Auxiliary Plant in Qeshm Duty Free Zone, no date (5 pages).
The Interprovincial Standards Red Seal Program, "National Occupational Analyses". http://www.red-seal.ca/Site/trades/analist_e.htm, Apr. 4, 2008 (2 pages).
The Interprovinicial Standards Red Seal Program, "Red Seal Designed Trades by Province and Territory", http://www.red-seal.ca/Site/trades/province/ab.htm, Jan. 18, 2007 (3 pages).
The Interprovincial Standards Red Seal Program, "Red Seal Designated Trades by Province and Territory", http://www.red-seal.ca/Site/trades/aig_province.htm, Jan. 30, 2007 (1 page).
The Interprovincial Standards Red Seal Program, "Red Seal Program", http://www.red-seal.ca/Site/about/redseal_e.htm, Oct. 31, 2006 (3 pages).
Mowers, "Oilsands development propel Edmonton-area fabricators to new heights", Oil & Gas Inquirer, Apr. 2007 (3 pages).
Oil Sands Jobs in Canada, "Oil Sands Jobs in Canada", http://oiljobfinder.com/albertaoilsands,php, webpage accessed Jun. 23, 2008 (1 page).
Oil Sands Discovery Center, "Welcome" http://www.oilsandsdiscovery.com/, webpage accessed Jun. 19, 2008 (2 pages).
Energy Minerals Division, "Oil (Tar) Sands", American Association of Petroleum Geologists, http://emd.aapg.org/technical_areas/oil_sands.cfm, Nov. 2004 (3 pages).
CBC News, "Northern route eyed for oilsands supply", http://www.cbc.ca/canada/north/story/2006/08/11/barge-traffic-m, Aug. 12, 2006 (1 page).
Northern Transportation Company Limited, "NTCL Route Map", http://www.ntcl.com/booking/routes.html, webpage accessed Jun. 20, 2008 (1 page).
Nexen, Inc., "SAGD and Upgrader Integration", http://nexeninc.com/Operations/Athabasca_Oil_Sands/Lon, Feb. 14, 2008 (1 page).
The Ventech Companies, "The Modular Advantage", http://www.ventech-eng.com/ModularRefineries.htm, webpage accessed Jun. 20, 2008 (2 pages).
Hunt, "Modular Construction Benefits Industrial Sector", Charleston Regional Business Journal, Jun. 19, 1999 ( 2 pages).
Cook, "The Alberta oilsands industry of 2007". Oilsands Review, Jan. 2007 ( 4 pages).
Lui, "Imperial Oil—A Leader in Oil Sands", Esso Imperial Oil, http://www.mobil1.ca/Canada-english/News/Speeches/N_S_Spe. Jul. 6, 2006 (9 pages).
Hydrocarbon Engineering, "World Review Canada", http://www.hydrocarbonengineering.com/hydrocarbon/HE_world_, 2008 (2 pages).
Vaughan, "Hitting pay dirt—in pipe-Pipe Fabrication, repair company meet needs in Canada", Practical Welding Today, May 9, 2006 (4 pages).
Budd, "SAGD projects bring billions in new industrial construction", ACM Alberta Construction Magazine, Sep. 2007 (2 pages).
Flint Energy Services, Ltd., "Flint Offers a Broad Spectrum of Services", http://www.flintenergy.com/services/index.html, webpage accessed Jun. 19, 2008 (4 pages).
AECON, "Aecon Industrial secures three key contracts in Western Canada", http://www.aecon.com/News_Releases/news04050501.aspx, Apr. 5, 2005 (2 pages).
DOWNSTREAM TODAY.COM, "Suncor Awards Jacobs EPC Contract for Voyageur", http://www.downstreamtoday.com/News/ArticlePrint.aspz?aid=11407, Jun. 17, 2008 (1 page).
CB&I, Project Profile—Shell Haven—Naphtha Minus Complex (NMC), CB&I Technologies Services, http://cbi.com/services/projects/shell-haven-nmc.aspx, webpage accessed Jun. 20, 2008 (1 page).
CB&I, "Process Plant Modularization", CB&I Technologies Services, http://cbi.com/services/process-plant-modularization.aspx, webpage accessed Jun. 20, 2008 (1 page).
Collier, "Fueling America Oil's Dirty Future", SFGATE.com, http://sfgate.com/cbi-bin/article. cbi?f=/c/a/2005/05/22/MNG, May 22, 2005 (5 pages).
Ablerta Energy, "What is Oil Sands", http://www.energy.alberts.ca/OilSands/793.asp, Jun. 2, 2008 (2 pages).
Alyeska Pipeline Service Company, "Pipeline reconfiguration—Crude Oil Pump System", Jul. 19, 2005 (3 pages).
Alyeska Pipeline Service Company, "Pipeline reconfiguration—Project and Module Facts", Jul. 25, 2005 (2 pages).
Bauman, "Construction work spills over Alutiiq", Alaska Journal of Commerce, Sep. 25, 2005 (6 pages).
"Module manufacturing makes sense for Alaska: these truckable and sealift modules are manufactured here and shipped to North Slope", Alaska Business Monthly, May 1, 2004 (8 pages).
Jones, "Oil's new face", Alaska Business Monthly, May 1999 (2 pages).
OPTI Canada, Inc., "OPTI Canada Announces Third Quarter 2005 Results", Oct. 13, 2005 (10 pages).
Mandel, "Building Blocks: Constructing refineries, one module at a time", Welding Magazine, May 15, 2007 (4 pages).
STREETINSIDER.COM, "Cordy Announces New Business Relationship with Berry Y&V Industrial Constracting, ULC", http://www.streetinsider.com/Press+Release/Cordy+Announc, Jun. 4, 2008 (2 pages).
Falstad, "Partnership Buys Major Idled Manufacturing Facility", RedOrbit News, http://www.redorbit.com/modules/news/tools.php?tools=print&id, Mar. 10, 2008 (3 pages).
Herron, "Bitumen from Canadian Oil Sands the World's New Marginal Supply of Oil", Petroleum Equities, Inc., Jan. 2006 (15 pages).
Turner Industires, 2007 HBR Modularization Presentation, 2007 (30 pages).
Nieuwenburg, "Oil Sands", Nexen, 2005 (42 pages).
ASRC Energy Services, "Sea to Sand: Marine Transportation of Very Large modules to the Athabasca Oil Sands", SNAME Arctic Section, Oct. 17, 2007 (38 pages).
Bechtel, "Upgrading Alberta's Oil Sands: From Bitumen to Fuel", http://www.bechtel.com/assets/files/PDF/DetailDesign.pdf, Sep. 19, 2007 (2 pages).
Office Action received in parent U.S. Appl. No. 12/572,655 dated Nov. 8, 2011.
Response to Office Action filed in parent U.S. Appl. No. 12/572,655 dated Dec. 1, 2011.

* cited by examiner

| Highway Scheuerle Trailer Module Payload Capacity By Season (Tons) | | | | | |
|---|---|---|---|---|---|
| Trailer Type Effective Date | Spring March 15 | Post Ban June 15 | Summer July 1 | Fall September 1 | Winter January 1 |
| Axle Group GVW | 27.6 | 30.9 | 34.2 | 37.5 | 40.8 |
| Axle Group Tare | 10.8 | 10.8 | 10.8 | 10.8 | 10.8 |
| Axle Group Payload | 16.8 | 16.8 | 21.2 | 24.2 | 30 |
| 8 Line 2 File | 69.4 | 82.7 | 95.9 | 109.1 | 123.3 |
| 10 Line 2 File | 86 | 102.5 | 117.9 | 134.4 | 151 |
| 12 Line 2 File | 102.5 | 123.4 | 143.3 | 158.7 | 158.7 |
| 8 Line 4 File | 137.8 | 158.7 | 158.7 | 158.7 | 158.7 |
| 10 Line 4 File | 163.1 | 163.1 | 163.1 | 163.1 | 163.1 |
| 12 Line 4 File | 173 | 173 | 173 | 173 | 173 |

*FIG. 12A*

Conventional Scheuerle

| # Axles | Deck | Tare | Payload (Lbs.) - For Pavement Only | | | | | Site Moves (75% Capacity) (45,000 / Axle) |
|---|---|---|---|---|---|---|---|---|
| | | | Spring (24,250 / Axle) | Post Ban (27,340 / Axle) | Summer (29,985 / Axle) | Fall (39,070 / Axle) | Winter (25,940 / Axle) | |
| 4 | 21'-0" | 44,000 | 53,000 | 65,360 | 75,940 | 88,280 | 99,760 | 136,000 |
| 6 | 30'-10" | 61,100 | 84,400 | 102,940 | 118,810 | 137,320 | 154,540 | 208,900 |
| 8 | 40'-9" | 88,000 | 106,000 | 130,720 | 151,880 | 176,560 | 199,520 | 272,000 |
| 10 | 52'-1" | 105,100 | 137,400 | 168,300 | 194,750 | 225,600 | 254,300 | 344,900 |
| 12 | 62'-0" | 115,400 | 175,600 | 212,680 | 244,420 | 281,440 | 315,880 | 424,600 |
| 14 | 71'-10" | 132,600 | 206,900 | 250,160 | 287,190 | 330,380 | 370,560 | 497,400 |
| 16 | 81'-8" | 143,000 | 245,000 | 294,440 | 336,760 | 386,120 | 432,040 | 577,000 |
| 18 | 91'-6" | 171,600 | 264,900 | 320,520 | 368,130 | 423,660 | 475,320 | 638,400 |
| 20 | 101'-3" | 200,200 | 284,800 | 346,600 | 399,500 | 461,200 | 518,600 | 699,800 |

*FIG. 12B*

Inter-Combi (Consecutive Axles) Scheuerle

| # Axles | Deck | Tare | Payload (Lbs.) - For Pavement Only ||||| Site Moves |
|---|---|---|---|---|---|---|---|---|
| | | | Spring (24,250 / Axle) | Post Ban (27,340 / Axle) | Summer (29,985 / Axle) | Fall (39,070 / Axle) | Winter (25,940 / Axle) | (75% Capacity) (45,000 / Axle) |
| 4 | 21'-0" | 34,470 | 62,530 | 74,890 | 85,470 | 97,810 | 109,290 | 190,380 |
| 6 | 29'-6" | 48,170 | 97,330 | 115,870 | 131,740 | 150,250 | 167,470 | 289,105 |
| 8 | 40'-6" | 64,970 | 129,030 | 153,750 | 174,910 | 199,590 | 222,550 | 384,730 |
| 10 | 49'-2" | 78,670 | 163,830 | 194,730 | 221,180 | 252,030 | 280,730 | 483,455 |
| 12 | 62'-0" | 92,370 | 198,630 | 235,710 | 267,450 | 304,470 | 338,910 | 582,180 |
| 14 | 71'-10" | 109,170 | 230,330 | 273,590 | 310,620 | 353,810 | 393,990 | 677,805 |
| 16 | 81'-8" | 125,970 | 262,030 | 311,470 | 353,790 | 403,150 | 449,070 | 773,430 |
| 18 | 91'-6" | 132,600 | 303,900 | 359,520 | 407,130 | 462,660 | 514,320 | 879,225 |
| 20 | 101'-3" | 153,370 | 331,630 | 393,430 | 446,330 | 508,030 | 565,430 | 970,880 |

*FIG. 12C*

Inter-Combi 'European Style' Scheuerle

| # Axles | Deck | Tare | Payload (Lbs.) - For Pavement Only ||||| Site Moves |
|---|---|---|---|---|---|---|---|---|
| | | | Spring (24,250 / Axle) | Post Ban (27,340 / Axle) | Summer (29,985 / Axle) | Fall (39,070 / Axle) | Winter (25,940 / Axle) | (75% Capacity) (56,200 / Axle) |
| 14 | 71'-10" | 108,000 | 231,500 | 274,760 | 311,790 | 354,980 | 395,160 | 678,975 |

*FIG. 12D*

Inter-Combi 'Road Style' Scheuerle

| # Axles | Deck | Tare | Payload (Lbs.) - For Pavement Only ||||| Site Moves |
|---|---|---|---|---|---|---|---|---|
| | | | Spring (27,560 / Axle) | Post Ban (20,855 / Axle) | Summer (34,170 / Axle) | Fall (37,460 / Axle) | Winter (40,785 / Axle) | (75% Capacity) (56,200 / Axle) |
| 4 | 29'-6" | 40,170 | 70,070 | 83,290 | 96,510 | 109,750 | 122,970 | 184,680 |
| 6 | 49'-2" | 61,770 | 103,590 | 123,420 | 143,250 | 163,110 | 182,940 | 275,505 |
| 8 | 68'-10" | 81,970 | 138,510 | 164,950 | 191,390 | 217,870 | 244,310 | 367,730 |
| 10 | 88'-6" | 103,570 | 172,030 | 205,080 | 238,130 | 271,230 | 304,280 | 458,555 |
| 12 | 108'-2" | 123,770 | 206,950 | 205,080 | 286,270 | 325,990 | 635,650 | 550,780 |

*FIG. 12E*

| Row | Bridge | Length (m) | Spans (m) | Clear Roadway (m) | Bridgerail Height* (m) |
|---|---|---|---|---|---|
| 1 | WID Canal Site 16 on Hwy 560 | 44.0 | 11.0 - 11.0 - 11.0 - 11.0 | 12.1 | 1.1 |
| 2 | WID Irrigation Canal Bridge on Prov. Hwy 560 near Langdon | 20.7 | 6.1 - 8.5 - 6.1 | 10.7 | 0.8 |
| 3 | CPR Overpass on Hwy 1, 11 ki E of Chestermere | 33.6 | 10.7 - 12.2 - 10.7 | 12.2 | 1.1 |
| 4 | WID Irrigation Canal Bridge on Prov. Hwy 1, Near Strathmore (east only) | 11.0 | 11.0 | 13.7 | 1.1 |
| 5 | Crowfoot Creek Bridge on Hwy 1, 8km E of Cluny (east only) | 42.0 | 42.0 | 13.1 | 1.1 |
| 6 | EID Springhill Canal Bridge & Concrete Box on Prov. Hwy 1 | 36.6 | 7.6 - 10.7 - 10.7 - 7.6 | 13.7 | 1.1 |
| 7 | Matzhiwin Creek Bridge on Hwy 36, 14 km N of Duchess | 43.9 | 12.8 - 18.3 - 12.8 | 11.0 | 1.1 |
| 8 | Battle River Bridge on Hwy 36, 5 km SW of Alliance | 224.3 | 44.5 - 44.5 - 45.1 - 4.1 - 45.1 | 9.1 | 1.1 |
| 9 | Tributary to Iron Creek Bridge on Hwy 36, 7 km S of Killam | 66.4 | 20.4 - 25.6 - 20.4 | 11.0 | 1.1 |
| 10 | Hwy 4 | 10.1 | 10.1 | 12.8 | 0.8 |

FIG. 18

```
H.H.L.S. | Shipping Envelope           (Logo)
```
Please enter the following shipping envelope information:

☐ Length    ☐ No. of trailer axles
☐ Width     ☐ Overhang? Y/N
☐ Height    Describe Module:
☐ Weight    ☐ www.hhls.com/shipping_envelope    [next]

```
H.H.L.S. | Route Endpoints           (Logo)
```
Starting Point:
☐ Street
☐ State ☐ Zip ☐ Co.
Lat: ☐  Long: ☐
Destination:
☐ Street
☐ State ☐ Zip ☐ Co.
Lat: ☐  Long: ☐
www.hhls.com/route_endpoints

MODULE SUPPLY CHAIN

RELATED APPLICATION DATA

This application is a divisional application of U.S. patent application Ser. No. 12/572,655 entitled "Module Supply Chain," filed Oct. 2, 2009, which claims priority to U.S. Provisional Patent Application No. 61/102,130, entitled "Land-Based Refinery Supply Chain," filed Oct. 2, 2008, both of which are hereby entirely incorporated herein by reference.

BACKGROUND

Petroleum deposits are found throughout the world. In some places, such as in Alberta and Saskatchewan, Canada, oil sands contain large petroleum deposits. In Alberta, the oil sands are generally found in three regions, namely, the Athabasca, Peace River and Cold Lake regions, and cover a total of nearly 34.6 million acres. Alberta has a large-scale commercial industry devoted to recovering and processing oil sands.

The oil sands of Alberta and Saskatchewan may generally comprise approximately 10-12 percent bitumen, 80-85 percent mineral matter and 4-6 percent water. Thus, producing one barrel of oil may require digging up, moving and processing more than two tons of oil sand. Processed sand may then be returned to the recovery site for site reclamation.

Bitumen is a heavy, sticky, black viscous oil. At room temperature, bitumen's viscosity is not unlike that of cold molasses. Bitumen will generally not flow unless heated or diluted with lighter hydrocarbons. In comparison to conventional crude oil, which generally flows naturally or may be pumped from the ground, bitumen generally must be recovered in situ, or "in place." In situ recovery down to about 250 feet may be accomplished by open-pit mining. For example, bitumen recovery in the Athabasca region near Fort McMurray, Alberta, involves some of the world's largest trucks and shovels. Deeper bitumen deposits may require use of other techniques that reduce bitumen viscosity by heat or introduction of solvents.

Such techniques may include cyclic steam stimulation (CSS), which relies on high-pressure steam injected into the oil sand deposit. The heat softens the oil sand and the water vapor helps break the bitumen apart from the sand. For example, at Cold Lake, oil sands deposits may be heated by steam injection to bring bitumen to the surface, and then diluted with condensate for shipping by pipelines. Steam-assisted gravity drainage (SAGD), uses two horizontal wells, one several yards above the other. Low pressure steam is injected into the upper wellbore, thus heating the bitumen and reducing its viscosity to cause it to drain into the lower wellbore, where it is pumped out. In situ combustion (ISC, or "fireflooding"), such as toe-to-heel air injection, essentially burns some of the heavy oil in place to create a combustion zone that moves through the oil formation toward the production wells. Electro-thermal dynamic stripping process (ET-DSP), uses electricity to heat oil sands deposits to reduce bitumen viscosity, thus allowing production using simple vertical wells. Vapour recovery extraction (VAPEX), uses solvents rather than steam to displace oil and reduce bitumen viscosity. Other production techniques may include cold heavy oil production with sand (CHOPS), pressure pulsing techniques (PPT), inert gas injection (IGI), and various hybrids.

Once recovered, bitumen may be processed into an upgraded crude oil before it is transported and further refined to gasoline, diesel fuels, and other petroleum products. Bitumen processors may thus be located in close proximity to the in situ mining operation. Bitumen upgraders may be massive industrial complexes—for example, covering 1,000 acres or more—that may require, among other things, vast amounts of piping, large pressure vessels, heaters, pumping stations, holding tanks, metering devices, and blending facilities.

Bitumen processing plants may be "stick-built," or constructed from the ground up at the oil sands location on which they will operate. However, disadvantages to stick-built construction may include exposure to extreme adverse weather conditions, no local labor force, poor quality control, poor productivity, lack of existing transportation infrastructure, lack of existing utilities infrastructure, high material transportation costs, and inadequate raw material storage, and lack of existing human services and support infrastructure.

Alternatively, bitumen processing plants may be partially constructed from sub-assemblies or modules, e.g., pipe rack, process and/or equipment modules, that are fabricated, assembled and/or tested off-site, and transported to the heavy industrial plant site. A single large-scale bitumen processing plant may require the fabrication of several hundred to more than 1,000 modules. The modules may then be individually transported to the processing plant site for assembly. Because of the inland location of the Alberta oil sands, modules may be moved by land or marine transportation. Marine transportation, however, is extremely limited in that only certain processing plants have river access, and river access is blocked for much of the year by ice. Thus, modules are manufactured in significant population centers nearest the processing plants sites, namely, Fort McMurray and Edmonton. Although such towns provide some needed infrastructure, many of the disadvantages of stick-built construction nevertheless remain with module construction in such nearby industrial centers. Furthermore, by concentrating module fabrication and assembly in nearby population centers, additional disadvantages arise, such as exacerbated labor shortages, inflated labor costs due to scarce resources, outdoor module assembly in severe adverse weather, and exposure of town economics to single-industry job volatility.

Thus, there is a need for more efficient method and system of providing modules for assembly at a heavy industrial hydrocarbon processing plant site.

SUMMARY

A method of supplying modules to a hydrocarbon processing plant site, the method comprising establishing a large-sized module assembly site on one side of an international border; receiving raw construction materials at the assembly site; receiving a standard truck module at the assembly site; assembling a large-sized module using the raw construction materials and the standard truck module; and sending the assembled large-sized module by land across the international border to the hydrocarbon processing plant site for assembly.

A method of assembling a hydrocarbon processing plant, the method comprising rigging a large-sized module for transportation by land on one side of an international border; and sending said large sized module by land across the international border for assembly into a hydrocarbon processing plant.

A transportation logistics system comprising a server connected to a network; a database accessible by the server, the database containing heavy-haul transportation logistics information; and a mobile first client computer connected to the server via the network, the mobile first client computer being adapted to provide a graphical user interface configured to

BRIEF DESCRIPTION OF THE DRAWINGS

FIGS. 12A-12E illustrates exemplary trailer payload capacities by season.

FIG. 18 illustrates an exemplary transportation logistics database table containing bridge information.

FIGS. 20A-E illustrates an exemplary user interface screens for a heavy-haul transportation logistics system.

FIG. 21 illustrates an exemplary method for determining suitable large-module shipping routes.

DETAILED DESCRIPTION

Modular Heavy Industrial Hydrocarbon Processing Plant

Figure 1:
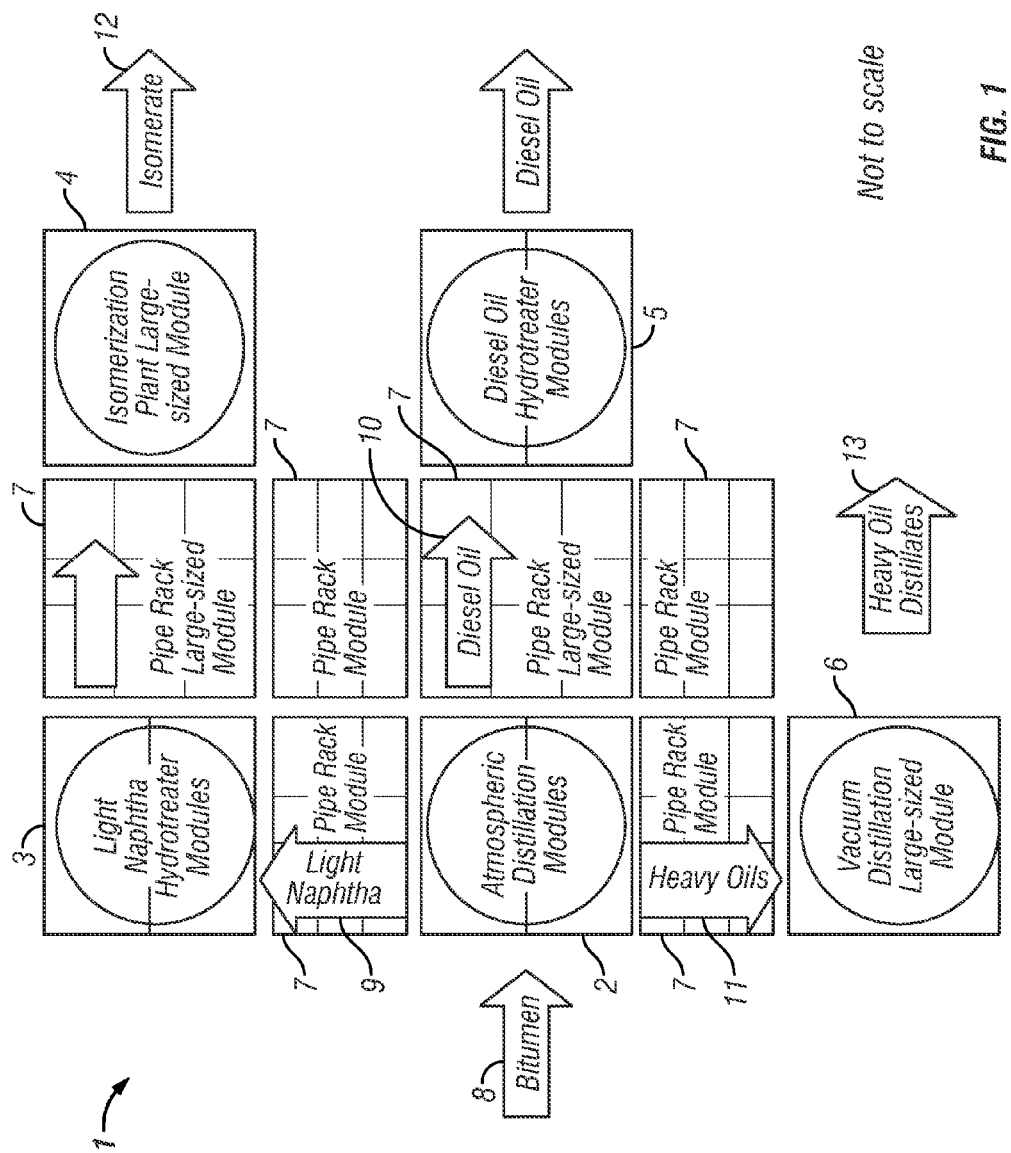
FIG. 1 illustrates one embodiment of part of a hydrocarbon processing plant assembled from standard truck modules and large-sized modules.

FIG. 1 illustrates a partial plan view of an exemplary embodiment of a heavy industrial hydrocarbon processing plant 1. As may be seen in the embodiment of FIG. 1, the processing plant 1 may be comprised of an atmospheric distillation unit 2, a light naphtha hydrotreater 3, isomerization unit 4, diesel oil hydrotreater 5, vacuum distillation unit 6, other process units that are not shown, and a system of piperacks 7 to transfer fluids throughout the processing plant 1. Bitumen feedstock 8 may be fed to the atmospheric distillation unit 2. A plurality of pipe racks 7 may be used to transfer various distillates from the atmospheric distillation unit 2 to other process units. For example, light naphtha distillate 9 may be transferred to a light naphtha unit hydrotreater 3, and from there to an isomerization unit 4. Diesel oil 10 may be transferred to a diesel oil hydrotreater 5. Heavy oils 11 may be transferred to a vacuum distillation unit 6. In some embodiments, isomerates 12 and heavy oil distillates 13 may be combined to form an upgraded synthetic crude oil that may be transported to another hydrocarbon processing plant for further processing.

In the embodiment of FIG. 1, the processing plant 1 may be assembled from various modules. The atmospheric distillation unit 2, light naphtha hydrotreater unit 3, and diesel oil hydrotreater 5 may each be comprised of two standard truck modules. Other units, such as the isomerization plant 4 and vacuum distillation unit 6, may be comprised of large-sized modules. The pipe racks 7 may be comprised of one or more standard truck modules and large-sized modules.

In other embodiments, a processing plant may comprise a hydrocarbon upstream extraction unit, SAGD process units, boiler/power/steam/utility units, gas recovery and processing units, crude oil refineries, water treatment plant, pipeline booster station, central processing plant, compressor stations, and the like. As used herein, a "hydrocarbon processing plant" is an exemplary processing plant, and should not be construed as limiting the other types of heavy industrial plant to which the disclosed system and method may apply.

Module Configuration

A module may be a major section of a heavy industrial hydrocarbon processing plant. Modules may be provided in a variety of suitable structural forms, such as a cube, rectangular hexahedron, or some other polyhedral form. A structural form may provide a framework or support frame that allows an entire module to be lifted for placement onto a truck, railcar, ship, into shipping containers, and/or onto support foundations. The support frame may also support various equipment, piping and electrical conduit. The support frame may further provide module assembly points, such as bolt plates or weldable edges, that permit modules to be robustly assembled into a heavy industrial hydrocarbon processing plant.

Figure 2:
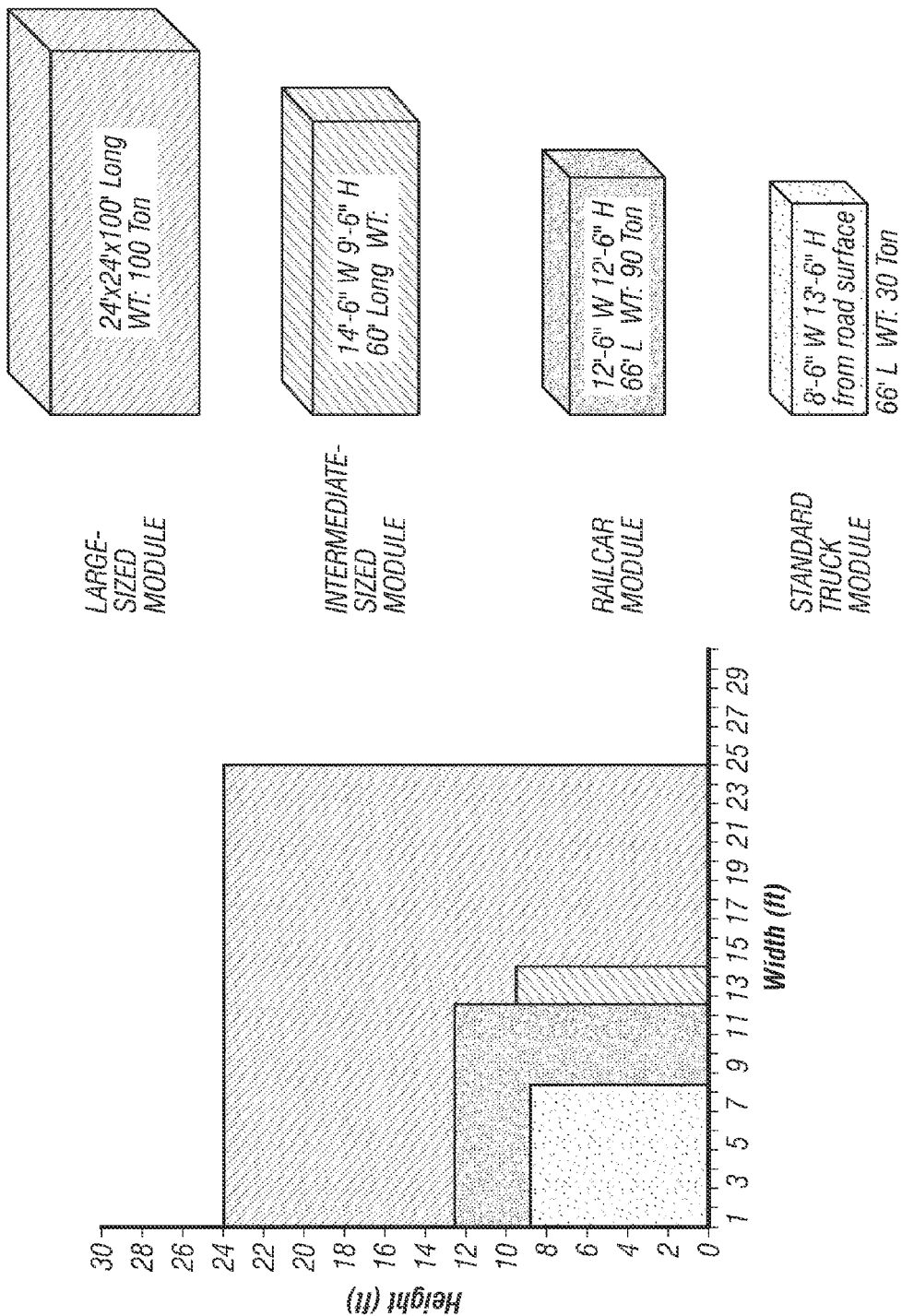
FIG. 2 illustrates various module sizes.

Modules may be provided in a variety of sizes. As may be seen in the embodiment of FIG. 2, a standard truck module may include those modules of a size and weight generally suitable for commercial carriers with no special arrangements, such as oversize permitting, required. For example, a standard truck module may in one embodiment be configured such that when loaded onto a standard commercial carrier, the gross weight per axle may be up to approximately 15,400 lbs, the overall length of the truck plus load may be up to approximately 75 ft, and the height of the load sized such that it may be up to approximately 13½ ft from the road surface, and the width may be up to approximately 8½ ft. Such a module may, in one embodiment, weigh up to approximately 60,000 lbs (30 tons).

A standard railcar module may include those modules of a size and weight generally suitable for transportation on a commercial railcar. For example, a standard railcar module may in one embodiment may be up to approximately 12½ ft wide, be up to approximately 12½ ft high, and be up to approximately 66 ft long. Such a module may, in one embodiment, weigh up to approximately 180,000 lbs (90 tons). In other embodiments, a standard railcar module may be up to approximately 14½ ft high, be up to approximately 13½ ft wide, be up to approximately 89 ft long, and weigh up to approximately 200,000 lbs (100 tons).

An intermediate-sized module may be somewhat larger than standard truck modules, and may require a special permit to transport over public roads. For example, an intermediate-sized module may in one embodiment be configured such that when loaded onto a tractor-trailer, the overall length of the truck plus load may be up to approximately 60 ft, and the height of the load sized such that it may be up to approximately 29½ ft from the road surface, and the width may be up to approximately 14½ ft, and the height may be up to approximately 9½ ft. In other embodiments, the height of the load sized such that it may be up to approximately 13½ ft from the road surface, and the width may be up to approximately 23 ft. Intermediate modules may include, for example, structural steel frames, empty modules with no piping or equipment installed, and single-level piping "sleeper" modules.

Figure 3:
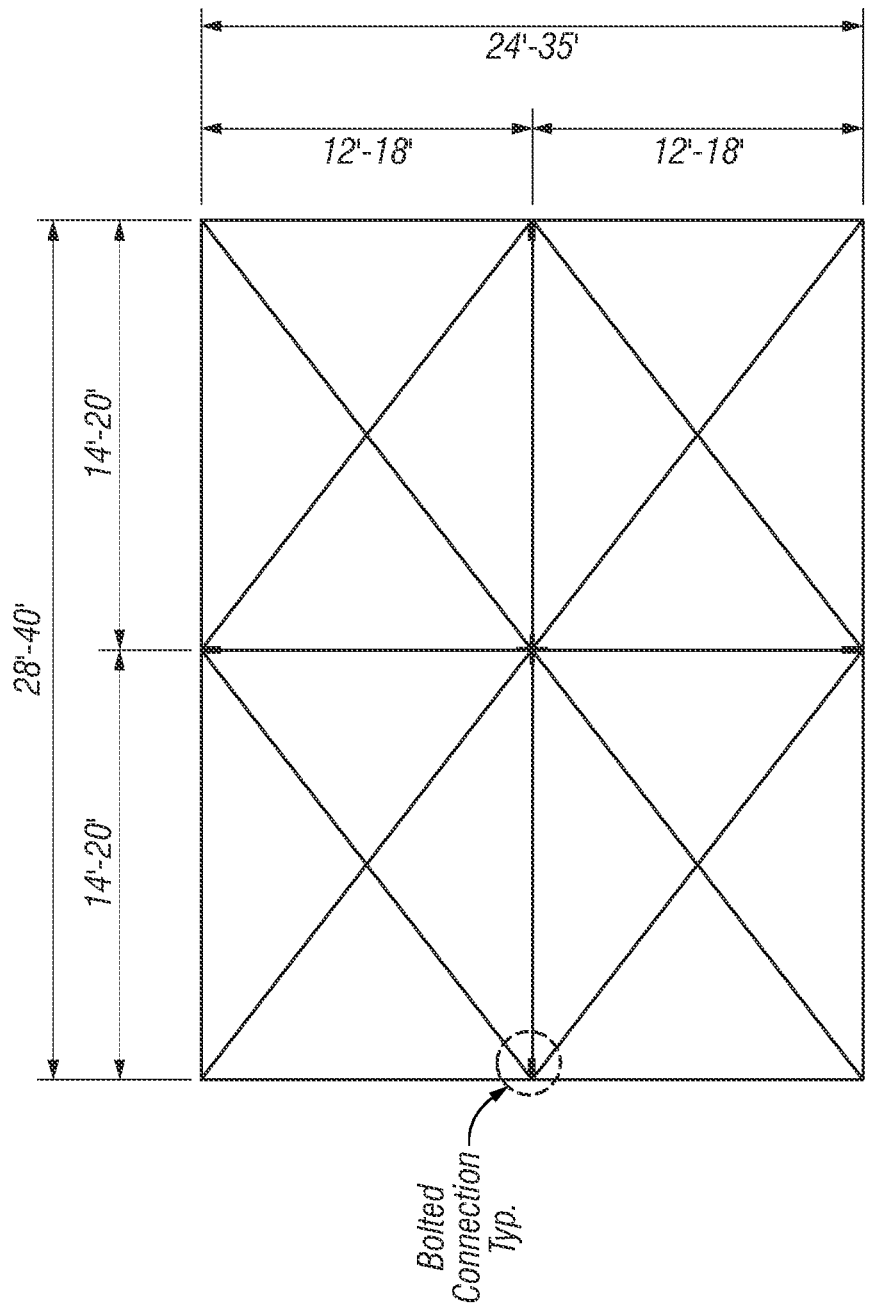
FIG. 3 illustrates a large-sized module assembled from smaller modules.

A large-sized module may be substantially larger than standard and intermediate-sized modules. In other embodiments, large-sized modules may be comprised of truck modules, railcar modules and/or intermediate-sized modules, as may be seen in FIG. 3. Large-sized module may in one embodiment be configured such that when loaded onto a tractor-trailer, the overall length of the truck plus load may be limited only by the trailer configuration and road conditions, such as turning radius and gradient. The height of the load may be sized so as to be up to approximately 29½ ft from the road surface, and the width may be up to approximately 24 ft. In one embodiment, a large-sized module may weigh up to approximately 156 tons and measures approximately 24 ft wide, 25½ ft high, and 100 ft long. In another embodiment, a large-sized module may weigh 70 tons and measure approximately 22 ft wide, approximately 22 ft high, and approximately 85 ft long. In another embodiment, a large-sized module may be up to approximately 120 ft long. Various large-sized modules may have different tonnages. For example, a large-sized pipe rack module may weigh approximately 85 tons, and a large-sized equipment module may weigh 156 tons due to differences in module density.

In some embodiments, large-sized modules may be larger than would fit within the foregoing shipping envelope. For example, a large-sized module comprising equipment that is not readily divisible may not fit within such a shipping envelope. Large-sized modules may include, for example, multi-level pipe racks with cable tray supports and multi-level cable trays. In some embodiments, large-sized modules may have projections, such as a cable trays and platforms, that extend beyond the 24 ft envelope. A large-sized module with such projections may be loaded onto a trailer such that the projections extend no less than approximately 13½ ft above the road surface, and extend on the curb or ditch side of the road rather than on the passing traffic side. If, in one embodiment, the large-sized module comprises a dressed load, e.g., with bolted-on ladders and platforms installed at the fabrication yard, the large-sized module may not extend beyond approximately 12 ft from the trailer centerline on the ditch or curb side. On the traffic side, the portion of the large-sized module above a line 45 degrees up from the large-sized module's horizontal centerline may not extend beyond an approximately 12 ft radius. The portion of the large-sized module below the 45-degree line may not extend beyond approximately the edge of the trailer.

Modules may be provided for a variety of processing plant sections. For example, a pipe rack module may be comprised of structural steel with one or more tiers of piping, electrical heat tracing (EHT), insulation, instrumentation, cable tray, wiring, lighting, and fireproofing. In one embodiment, all work on pipe rack modules, such as hydrotesting and non-destructive testing (NDT), may be completed as much as possible before transportation to the plant site.

A process module or equipment module may be comprised of structural steel with one or more pieces of process equipment, platforms, piping, EHT, insulation, instrumentation, cable tray, wiring, lighting and fireproofing. In one embodiment, all work on process or equipment modules, such as hydrotesting, draining, drying, preservation and NDT, may be completed as much as possible before transportation to the plant site.

Modules may be designed to allow relatively simple, quick connections between multiple modules in the field using standard piping and electrical components to provide a complete hydrocarbon processing plant. Modules may be constructed and interconnected so as to provide support for individual equipment, piping, and electrical wiring for power and control. Interfaces for piping, electrical wiring and other equipment may be provided to allow such quick interconnection. For example, modules may comprise pipe racks to provide for fluid flow within the processing plant, and for fluid interconnection between various process units and other component systems of a hydrocarbon processing plant.

Modules may be placed adjacent to each other in horizontal combination, vertical combination, or both, and interconnected to form a hydrocarbon processing plant or hydrocarbon processing plant sub-assembly. For example, modules may be assembled in a horizontal combination on a concrete pad set in the ground. Alternatively, modules may be assembled into a vertical hydrocarbon processing unit, such as a vertical crude/vacuum hydrocarbon processing plant. In one embodiment, a vertical hydrocarbon processing unit may provide a complete crude distillation process system combined with a complete vacuum process system for distillation, separation, stripping, and/or removal of petroleum fractions such as liquid petroleum gas (LPG), gasoline, naphtha, kerosene, gas-oils and residue, and particulate from crude oil. Similarly, pipe rack modules may be assembled horizontally and/or vertically.

Modules may be used to change the configuration or hydrocarbon processing capacity, capability or product lines of an existing hydrocarbon processing plant, or may be used to construct a new hydrocarbon processing plant.

In one embodiment, modules may comprise a thermocracking unit that processes long hydrocarbon chains into smaller hydrocarbons. Cracking occurs by breaking longer hydrocarbon chains into smaller hydrocarbon chains that are more desirable. An exemplary thermocracking process, hydrocracking, uses a feedstock such as vacuum gas oils (VGO). The feedstock is heated, introduced into a reactor vessel, and mixed with a hydrogen stream in the presence of a catalyst. The reaction vessel operates at extremely high temperatures and pressures. The combination of temperature, pressure, and the presence of free hydrogen molecules trigger simple chemical reactions.

In another embodiment, a motor control center module may house electrical generation motors and their controls for supplying power to other modules. A control room module may be provided to house computer systems and other system control equipment for operating the hydrocarbon processing plant. The control systems may also be connected to a remote location, for example, via a satellite link, to allow monitoring of the facility by an offsite team of engineers. These engineers can provide notice to control operators of potential equipment failures, review for identification of operational errors, and provide a direct resource for troubleshooting problems.

Other modules may wholly or partially comprise, for example, a delayed coker unit, control system, and various other hydrocarbon processing and related equipment, such as cat crackers, fluidized bed cat crackers, hydrocrackers, thermal crackers, atmospheric distillation columns, vacuum distillation columns, crude oil heaters, vacuum column heaters, pumps, vacuum pumps, vacuum separators, desalinization devices, water tanks, heat exchangers, pressure tanks, stripper columns, separators, flash drums, cooling towers, hydrogen plants, hydrotreating heaters, hydrotreating columns, hydrogen separators, fire suppression equipment, once-through steam generators, pipe racks, gasifier reactor, gasifier feed pumps, water treatment vessels, hydrocrackers, heat recovery steam generators, hydrogen compressors, and fractioner columns.

Possible hydrocarbon processing processes for which a modular hydrocarbon processing plant constructed according to the disclosure hereof may be used include, but are not limited to, the following: SAGD and other hydrocarbon extraction process units, atmospheric distillation, vacuum distillation, hydrotreating, catalytic reforming, isomerization, hydrocracking, catalytic cracking, delayed coking, residue reduction, asphalt, gasoline blending, sulfur recovery, ethylene processing, hydrogen production, power/utility plants, and liquid petroleum gas (LPG) production.

Module Fabrication and Assembly

Module fabrication and assembly may include assembly of fabricated support steel, pipe spool installation, equipment and instrument installation (such as meters and control valves), pipe spool hydrotesting, non-destructive examination (NDE) of weld joints, EHT, insulation and cladding, painting, fireproofing and preparation for shipment. Module fabrication and assembly may also include installation of pipe valves and fittings; installation of instrument sub-headers and associated pneumatic tubing; installation of instrument stands, transmitters and associated winterization material; installation of conduit and cable trays; installation of on-lighting module panels; installation of lighting receptacles and fixtures (including shades), and wiring to an on-module lighting panel; installation of convenience receptacles; installation and termination of cables between panels and fixtures; installation of instrument junction boxes; installation and termination of cables between instruments and on-module junction boxes; and prewiring of instrumentation and termination in a skid edge junction box such that signals can be wired back to a process control system marshalling cabinet with multi-conductor cables once the modules are placed on-site. Also, each module's center of gravity may be ascertained for transportation purposes.

Figure 4:
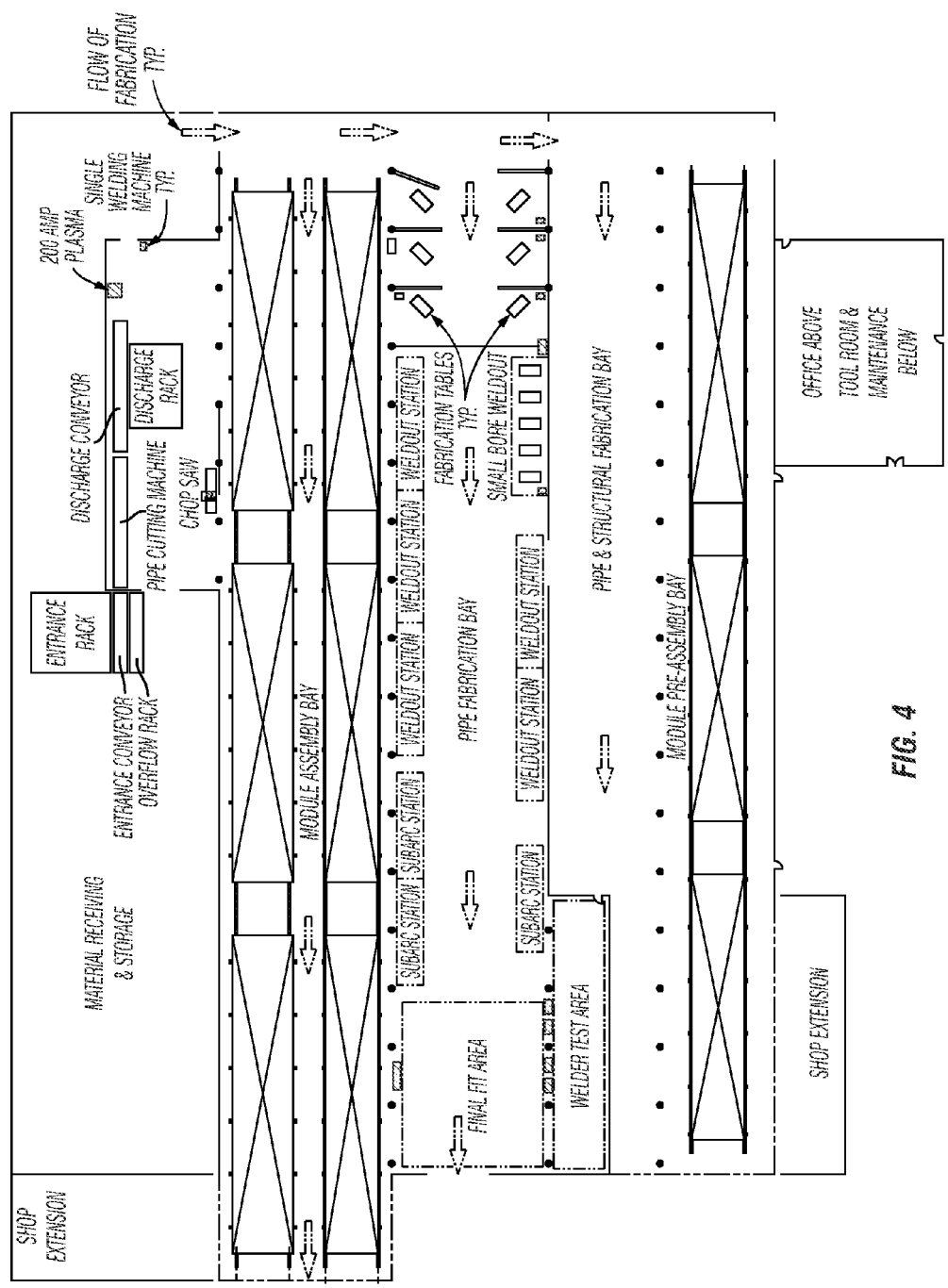
FIG. 4 illustrates one embodiment of a module fabrication and assembly yard.

FIG. 4 illustrates an exemplary module fabrication and assembly yard. In this embodiment, a module assembly line may be provided at a module fabrication facility alongside other assembly lines, such as pipe fabrication bays and sub-assembly bays. The module fabrication facility may include an area for receiving and storing raw materials, welding bays, sub-assembly bays, offices, pipe-cutting stations and other fabrication and assembly process areas.

Figure 5:
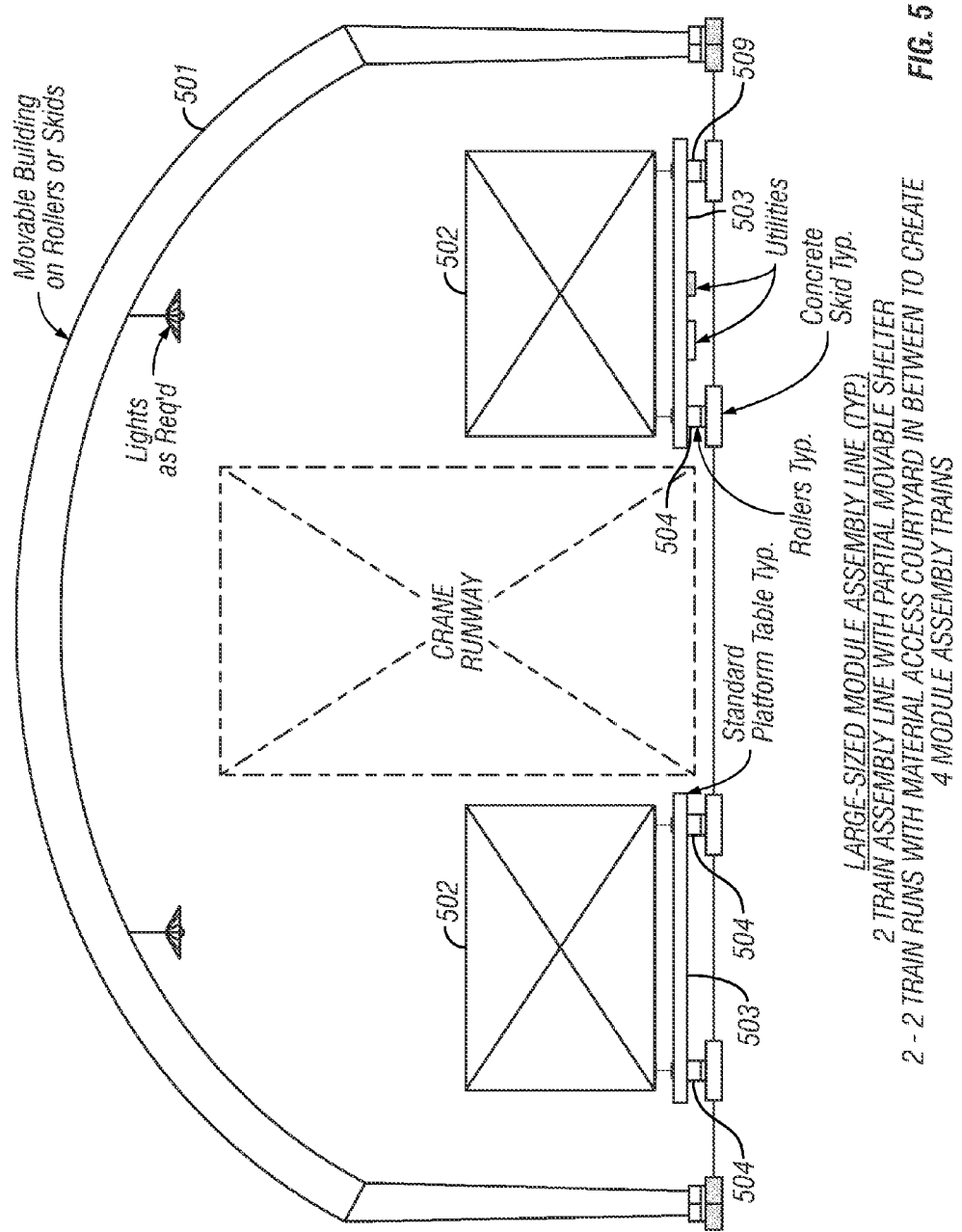
FIG. 5 illustrates one embodiment of a module assembly line.

A sheltered module assembly yard may be configured as shown in FIG. 5. As may be seen in FIG. 5, a system of movable canopies 501 may be provided to shelter a module assembly line. Modules 502 may be mounted on large movable platforms 503 for assembly. The platforms may be mounted on rollers 504 for movement along the assembly line. A gantry crane may be provided to assist in assembly of modules and in loading of modules on to a trailer for transportation to the processing plant site.

Figure 6:
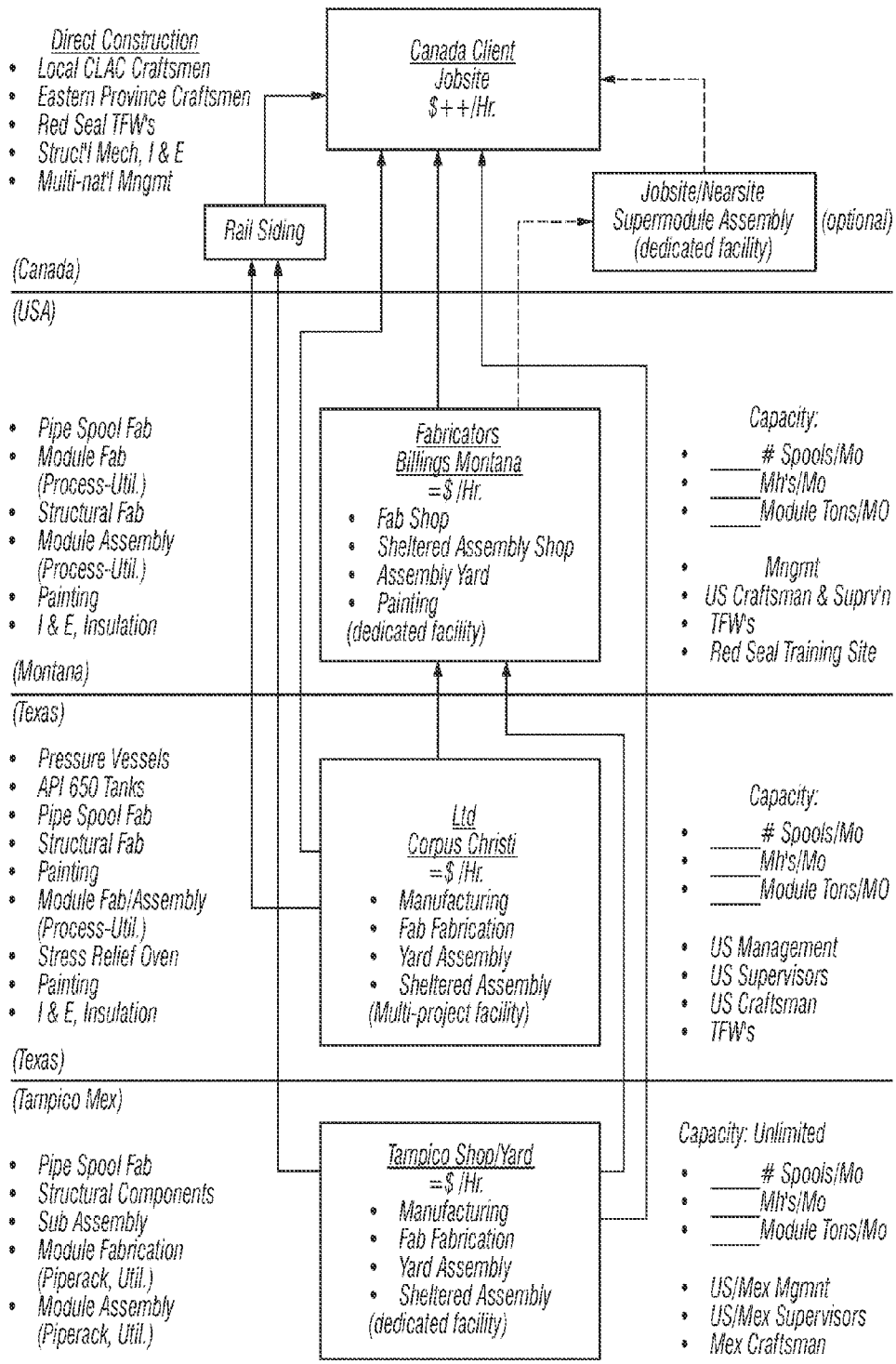
FIG. 6 illustrates one embodiment of a module supply chain.

Modules may be built in a series of assembly operations remote from the heavy industrial hydrocarbon processing plant site. FIG. 6 depicts, in one embodiment, a simplified representation of the fabrication, assembly, transportation, and delivery of modules across North America. As may be seen in FIG. 6, raw materials may be supplied, and modules and components may be assembled at various points along the supply chain.

In the embodiment of FIG. 6, pipe spool fabrication, structural steel fabrication, and standard truck, intermediate-sized and railcar module fabrication and assembly may be accomplished in Mexico, such as at the coastal town of Tampico. For example, pipe rack and equipment modules may be wholly or partially constructed at the Tampico yard. The manufacturing and fabrication may occur at uncovered and/or sheltered assembly yards dedicated to such purposes. Management and supervisors may be from the United States, from Mexico, or some combination of US and Mexican personnel. In one embodiment, the yard may be located near a railhead and seaport. Raw materials may be transported to the Mexico yard by rail or sea. Mexico may provide advantageous labor costs compared to the United States and/or Canada. There may be little or no competition between Mexican labor resources and US or Canadian labor resources. In one embodiment, Mexican labor may be qualified to fabricate certain components and assemble certain modules. Furthermore, Tampico may have substantially more advantageous weather conditions than Canada. Assembled modules, components and sub-assemblies may be transported by truck or rail to the United States or Canada, such as to Corpus Christi, Tex., Billings, Mont., or to the final plant site for further work or assembly into a heavy industrial hydrocarbon processing plant.

In the embodiment of FIG. 6, assembly of other standard truck, intermediate-sized and railcar modules, or further work on modules from Mexico, may occur at Corpus Christi, Tex. in the United States. Components such as pressure vessels and API 650 tanks may be advantageously assembled. Further, pipe spool fabrication and other structural component fabrication may occur at a yard in Corpus Christi. As with the Tampico yard, the Corpus Christi yard may also provide a sheltered location for that work, and for testing modules. Other aspects of construction, such as painting, metallurgical stress relief, insulation and electrical work may be performed at the Corpus Christi yard, as well. The Corpus Christi yard may be used for assembly of modules that require a more skilled and experienced workforce than may be available in either Mexico or Canada. The Corpus Christi yard may employ temporary foreign workers, such as Canadian or Asian workers with Canadian Red Seal certification. Assembled modules, components and sub-assemblies may be transported by truck or rail to Billings, Mont., or to the final plant site in Canada for further work or assembly into a heavy industrial hydrocarbon processing plant.

Further fabrication and assembly of modules and components may be accomplished at a yard closer to the Alberta oil sands, yet far enough away to be relatively unaffected by labor and other constraints in the oil sands region. In the embodiment of FIG. 6, further work on modules, components and sub-assemblies from Corpus Christi and Tampico may be accomplished at a sheltered assembly yard in Billings, Mont. As at the Tampico and Corpus Christi yards, pipe spool fabrication may be accomplished at the Billings yard, as well as other module and structural component fabrication modules that may be assembled, painted, insulated and wired. Significantly, unlike at the Tampico and Corpus Christi yards, large-sized modules may be fabricated and assembled in Billings, Mont., for overland transportation to a heavy industrial hydrocarbon processing plant site or site-adjacent "super-module" assembly yard in the Alberta oil sands region. Assembled large-sized modules may be transported by special heavy-haul tractor-trailer, as described further below.

The Billings yard may provide a place to train and certify workers (such according to the Canadian interprovincial Standards Red Seal Program) for work in Canada, and may thus providing a pool of skilled labor for further module assembly at a heavy industrial hydrocarbon processing plant site. Such workers may include temporary foreign workers from various countries in the world. In one embodiment, US workers may be trained and certified for work in Canada. This approach may provide a substantially larger labor pool for module construction than at the plant site. Thus, assembly of large-sized modules in Montana, and overland transportation to the plant site advantageously avoids the labor shortages, lower labor skill levels, adverse weather conditions, material shortages, high costs, excess transportation expenses, currency risks, and material storage problems that have hitherto plagued construction of heavy industrial hydrocarbon processing plants in the Alberta oil sands region.

Figure 7:
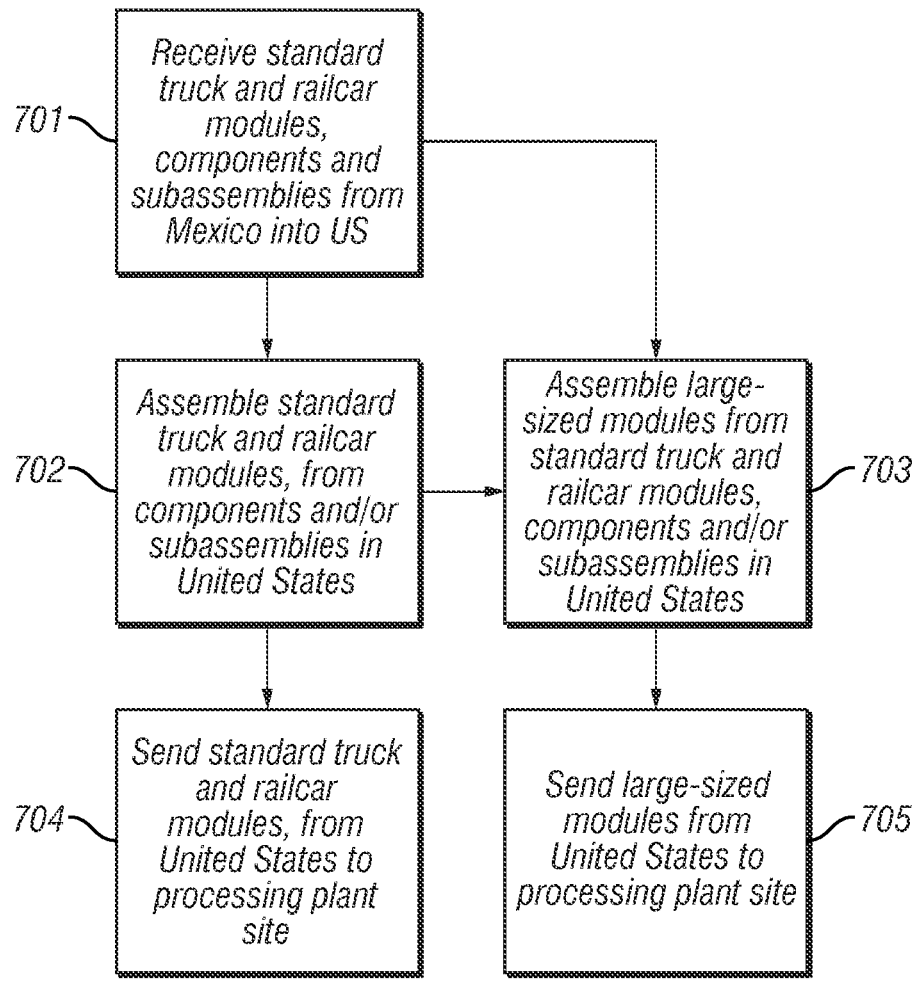
FIG. 7 illustrates an exemplary method of assembling and supplying modules.

FIG. 7 illustrates an exemplary process of providing modules for assembly into a hydrocarbon processing plant. At step 701, a United States-based provider, such as a heavy construction firm, may receive standard truck and/or railcar modules, components, raw materials and/or subassemblies from Mexico. At step 702, the provider may further work on the received modules, and may assemble standard truck and/or railcar modules from the received components, raw materials and/or subassemblies. At step 703, the provider may assemble large-sized modules from the standard truck and/or railcar modules created at step 702. The provider may also assemble large-sized modules from the components, subassemblies and/or raw materials received at step 701. The provider may also assemble large-sized modules from a combination of standard truck and/or railcar modules, components, subassemblies and raw materials from steps 701 and 702. At step 704, the provider may send standard truck and/or railcar modules into Canada for assembly at a processing plant site. At step 705, the provider may send large-sized modules into Canada for assembly at a processing plant site. The modules and large-sized modules may be assembled and interconnected to form a hydrocarbon processing plant, such as the hydrocarbon processing plant of the embodiment of FIG. 1.

In one embodiment, many of those modules may be shipped into a "supermodule" assembly yard adjacent the heavy industrial hydrocarbon processing plant site. A "supermodule" may comprise various combinations of standard truck modules, railcar modules, intermediate-sized modules and/or large-sized modules assembled together. A "supermodule" may not be transported by public road, but may be assembled and installed at or near the plant site using self-propelled module transporters (SPMTs), gantry cranes and other heavy erection equipment. At the plant site, local craftsmen, such as Christian Labor Association of Canada (CLAC), may assemble the site. Also, non-union Red Seal-certified temporary foreign workers (TFWs) may be utilized, such as those trained at the Billings yard.

Figure 8:
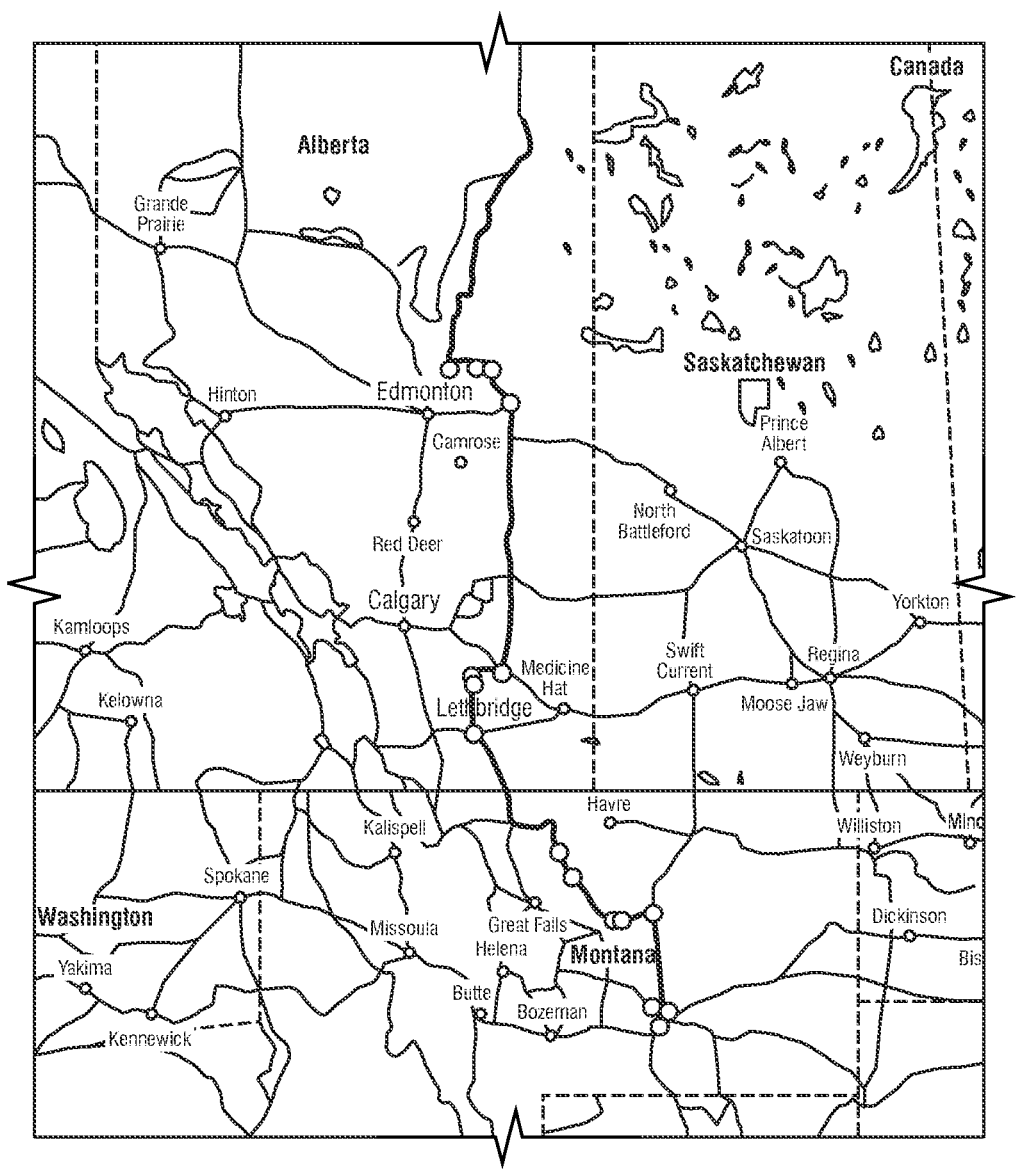
FIG. 8 illustrates one embodiment of a large-module transportation route.

In one embodiment, a transportation route from Billings, Mont. to Ft. McMurray, Canada may be provided as seen in FIG. 8. In the embodiment of FIG. 8, a large-sized module may be transported along the following route from Billings, Mont. to the US-Canadian border: $32^{nd}$ Street, Hesper Road, Shiloh Road, Grand Avenue, $88^{th}$ Street, Lipp Road, S-401, Buffalo Trail, S-302, Molt Road, Popelka Road, Ballard Ivie Road, MT-3, 21 Mile Road, US-87, MT-19, US-191, MT-81, MT-80, S-223, US-2, Lothair Rd, S-343, Oilmont Road, Service Road (Swayze Road, Exit-385, I-15 to Sweetgrass port. Across the border, an exemplary route may comprise: from Coutts, Alberta, Hwy 4, Hw 36 (at Warner, Alberta), Hwy 3, Hwy 36 (again just past Taber), and to the high-load corridor to Ft. McMurray.

In other embodiments, large-sized modules may be fabricated and assembled in a another location remote from the Alberta oil sands, and transported overland to the Alberta oil sands regions through other locations, such as through Missoula, Mont. For example, a large-sized module may be fabricated and assembled outside the United States, transported into the United States by ship or barge, and transported from the United States to the Alberta oil sands by land as described herein.

Large-sized modules may be constructed away from the plant site for a variety of technical reasons, as well. For example, a single-piece vessel may need to be post-weld heat treated in an enclosed fabrication yard rather than welded and heat-treated at the plant site because it may be difficult to control the quality of the heat treatment in an exposed environment. For a further example, process modules with piping, vessels, exchangers, pumps and control equipment are better assembled in an enclosed fabrication rather than out in the field to ensure proper quality control. For another example, process modules may be better fabricated at a location where one company can ensure the correct functioning of the overall process rather than at the plant site, where various trades (e.g., electricians, welders, etc.) may complete their part of the assembly or installation with no regard to the overall process module. For yet another example, process skid modules containing sophisticated equipment may be better assembled in a specialized shop offsite by trained workers than by less skilled field workers. In another example, module construction may be more safely accomplished in a controlled environment, thus avoiding exposure of workers to hazardous environmental conditions, such as $H_2S$, hot coke and limited visibility. In a final example, steel pipe-rack modules may be better fabricated in a shop rather than erected at the plant site so as to ensure that dimensional tolerances are met.

By constructing large-sized modules away from a plant site, such as in Montana, Wyoming, Idaho, North Dakota and Washington, and shipping them by heavy trailer to the plant site, substantial labor and material savings may be realized. By further allocating manufacturing and fabrication of various module subassemblies to different locations across North America, many of the labor and materials pressures suffered by stick-building heavy construction companies located near the Athabasca oil sands may be avoided. Use of a non-Canadian labor pool to assemble modules and large-sized modules reduces competition and diminishment of the plant-site labor pool. Also, construction in Mexico and the United States reduces exposure to harsh Canadian weather. Various labor pools are utilized, such as those in Canada, United States and Mexico. Further, in other embodiments, large-sized modules may be fabricated and assembled in one or more locations remote from the Alberta oil sands, and transported overland to the Alberta oil sands regions through other locations, such as through Missoula, Mont.

Module Transportation

In one embodiment, large-sized modules may be transported by one or more Scheuerle Combi-series trailers. Other suitable trailers may be used, as well, such as those manufactured by Goldhofer and Nicolas. Suitable trailers may be pulled by tractors such as those manufactured by Mammoet. Suitable trailers may be steerable, load-balancing, load-distributing, having high bending moments, modular hydraulic, self-propelled and/or combined into a variety of configurations and lengths. Suitable trailers may be provided with various heavy-duty equipment, such as long-load equipment, goosenecks, saddles, pulling devices, loading decks, crawler-decks, drop-decks, vessel decks, drawbars, hydraulic power-packs, side-by-side devices, hydraulic bolt couplings, long-load turntables, rear lighting crossbeams, and radio controls.

For example, a Scheuerle inter-combi trailer may be of a box-frame construction, and provided with drive axles powered by hydraulic motors. A power pack may provide metered fluid to drive the wheels in the direction that they are pointing.

A central computer may allow the axles to turn to allow the trailer to move in a variety of directions. The trailer decks may be leveled, raised and lowered using hydraulic suspension to accept and release loads. Two axles on each line may support the trailer structure. Each axle may have four tires, thus providing 8 tires on a line. The trailer may be provided with hydraulic brakes and a backup mechanical spring brake if the hydraulic brakes fail.

In one embodiment, a module may be loaded onto a tractor-trailer such that the shipping envelope of the tractor-trailer with the loaded module is up to approximately 24 feet wide, up to approximately 145 feet long, and up to approximately 29½ feet high from the road surface. In such an embodiment, the weight on the road may be up to approximately 16,100 lbs at the steering axle; up to approximately 37,500 lbs at the set of drive axles; up to approximately 79,500 lbs at a first set of trailer axles; up to approximately 79,500 lbs at a second set of trailer axles; up to approximately 79,500 lbs at a third set of trailer axles; up to approximately 79,500 lbs at a fourth set of trailer axles; up to approximately 79,500 lbs at a fifth set of trailer axles; and up to approximately 79,500 lbs at a sixth set of trailer axles.

Moving large-sized modules by Scheuerle trailer may require substantial logistical effort. For example, only certain roads can bear heavy loads. Traffic signals and power lines may have to be moved, traffic may have to be rerouted, and other accommodations and permissions may have to occur to support large-sized module transport along the network of roads from the United States to the hydrocarbon processing plant site. In one embodiment, suitable routes may be determined from a database of road conditions and transportation guidelines, as discussed further herein. Such conditions and guidelines may include the name of the road, the road length, various gas or service stations along the road, roadway weight limits, the historical road conditions by season, road size limits, grade, traffic load, holiday travel regulations, coordination with emergency services, daylight hours, flag car requirements, utility line placement, speed limits, load signage, radio communication requirements, lighting requirements, bridge placement, under- and over-passes, traffic light placement, peak traffic times, physical roadside obstacles, bridge weight and size limits, seasonal transportation bans, seasonal weight limits, axle selection and spacing, acceleration and deceleration limits, power line crossings, railroad crossings, permit details and contact information, and various transportation-related regulations.

Figure 9:
FIG. 9 illustrates Alberta high-load roads.

Various heavy haul routes may be planned. For example, FIG. 9 illustrates some of the heavy haul routes that may be available in Alberta, Canada, as designated by the Government of Alberta Ministry of Transportation (www.transportation.alberta.ca). Some of the route segments may include:

| High Load Corridor Route Segments | | | | |
|---|---|---|---|---|
| Highway | | From | | At |
| Hwy | 1 | SH | 797 | Jct 36 |
| Hwy | 11 | SH | 815 | SH 601 |
| Hwy | 14 | Jct | 17 | Jct 21 |
| Hwy | 15 | SH | 834 | Jct 21 |
| Hwy | 16 | SH | 753 | Jct 32 |
| Hwy | 17 | Jct | 14 | 22 km. N. of Jct 14 |
| Hwy | 19 | Jct | 2 | Jct 60 |
| Hwy | 21 | Jct | 15 | Jct 16 |
| Hwy | 21 | Jct | 14 | SH 625 |
| Hwy | 21 | SH | 601 | SH 625 |
| Hwy | 22 | Jct | 1A | 12 km N. of Sundre |

-continued

| High Load Corridor Route Segments | | | | |
|---|---|---|---|---|
| Highway | | From | | At |
| Hwy | 22 | Jct | 13 | SH 621 |
| Hwy | 28 | Jct | 36 | Jct 63 |
| Hwy | 29 | Jct | 36 (Duvernay) | Jct 36 (west of St. Paul) |
| Hwy | 32 | Jct | 16 | Jct 43 |
| Hwy | 36 | Jct | 1 | Jct 45 |
| Hwy | 36 | Jct | 45 | Jct 29 (Duvernay) |
| Hwy | 36 | Jct | 29 | Jct 28 |
| Hwy | 39 | Jct | 22 | Jct 60 |
| Hwy | 41 | Jct | 45 | Jct 55 |
| Hwy | 45 | Jct | 15 | SH 831 |
| Hwy | 45 | Jct | 36 | Jct 41 |
| Hwy | 55 | Jct | 41 | SH 892 |
| Hwy | 60 | Jct | 19 | Jct 39 |
| Hwy | 63 | Jct | 28 | North End of Hwy 63 |
| SH | 560 | Calgary | | SH 797 |
| SH | 597 | Hwy | 2A | SH 815 |
| SH | 601 | Hwy | 11 | Hwy 21 |
| SH | 815 | SH | 597 | Hwy 11 |
| SH | 621 | Jct | 22 | SH 753 |
| SH | 625 | Jct | 2 | Jct 21 |
| SH | 753 | Jct | 16 | SH 621 |
| SH | 797 | Jct | 1 | SH 560 |
| SH | 831 | Jct | 45 | Jct 28 |
| SH | 834 | Jct | 14 | Jct 15 |

In some embodiments, for example, highway module payload capacity for a Scheuerle-type trailer may vary by season. In Alberta, for example, payloads beyond a certain weight may be banned from the heavy-haul routes during spring thaws, and the heaviest loads may be carried only during the winter when the ground freezes.

Figure 10:
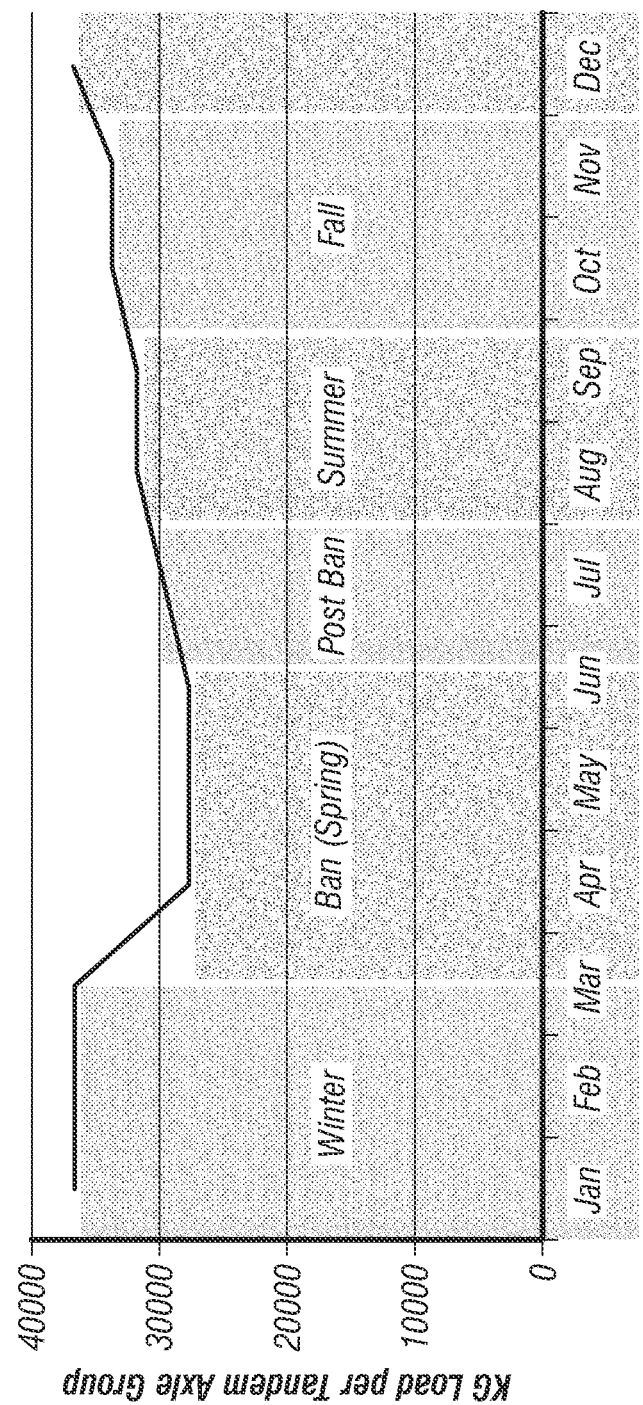
FIG. 10 illustrates seasonal pavement loading limits.

FIG. 10 illustrates, for that example, a graph showing pavement loading on a heavy haul route according to different seasons. As may be seen in FIG. 10, the heaviest loads may be carried deep in the winter season when the ground is frozen. During the spring season, thawing conditions make the ground softer and more unstable. Transportation of heavy loads may be banned during that time to avoid road damage and traffic obstructions. Summer and fall season conditions may permit heavier loads to be transported, at least on some heavy haul routes, as environmental conditions stabilize somewhat.

Figure 11:
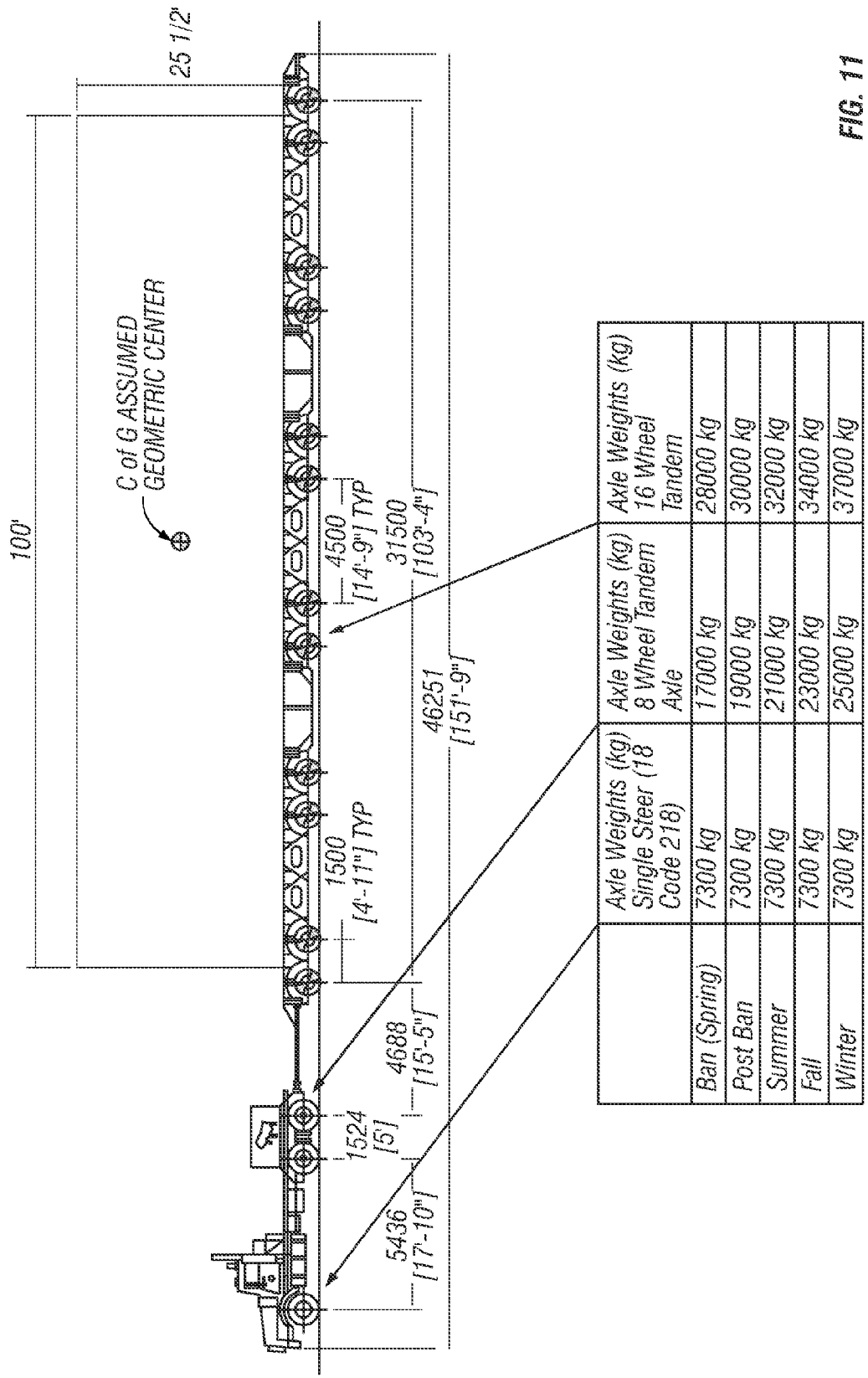
FIG. 11 illustrates one embodiment of a tractor-trailer loaded with a large-sized module and annotated with seasonal axle loading limits.

FIG. 11 illustrates an exemplary tractor-trailer configuration annotated with seasonal axle loads. As may be seen in the embodiment of FIG. 11, the steer axle weight of a heavy tractor may remain relatively constant, but the drive axle load may increase as the trailer load increases. In the embodiment shown, the steer axle weight may be at 7,300 kg, but the drive axle weights may vary from approximately 17,000 kg during the spring season, when hauling heavy loads is banned, to approximately 25,000 kg in the winter season, when road conditions permit heavier loads to be hauled. Increased trailer loads may require that one or more weights be placed over the drive tires to increase traction. In the embodiment of FIG. 11, a trailer carries a large-sized module with side elevation dimensions of 100 ft long by 25½ ft high. The weight of the large-sized module may vary according to seasonal road weight limits. During the spring season, for example, the large-sized module weight may translate to axle weights of approximately 28,000 kg. During the winter season, the large-sized module weight may translate to axle weights of approximately 37,000 kg. During other times of the year, other large-sized module weights may be permitted. For example, as seen in the embodiment of FIG. 11, the large-sized module weight may translate to axle weights of approximately 32,000 kg during the summer season.

In another embodiment, a highway Scheuerle trailer module payload capacity may vary by season, as may be seen in the chart of FIG. 12A. In this embodiment of a road-style Scheuerle trailer, an axle group may be considered to be two axles. For example, an 8-line 2-file trailer has 4 axle groups and an 8-line 4-file trailer has 8 axle groups. The charts of FIGS. 12B-12E provide further exemplary payloads for conventional, inter-combi, "European-style" and "Road Style" Scheuerle trailers that may be used in some embodiments.

Figure 13:
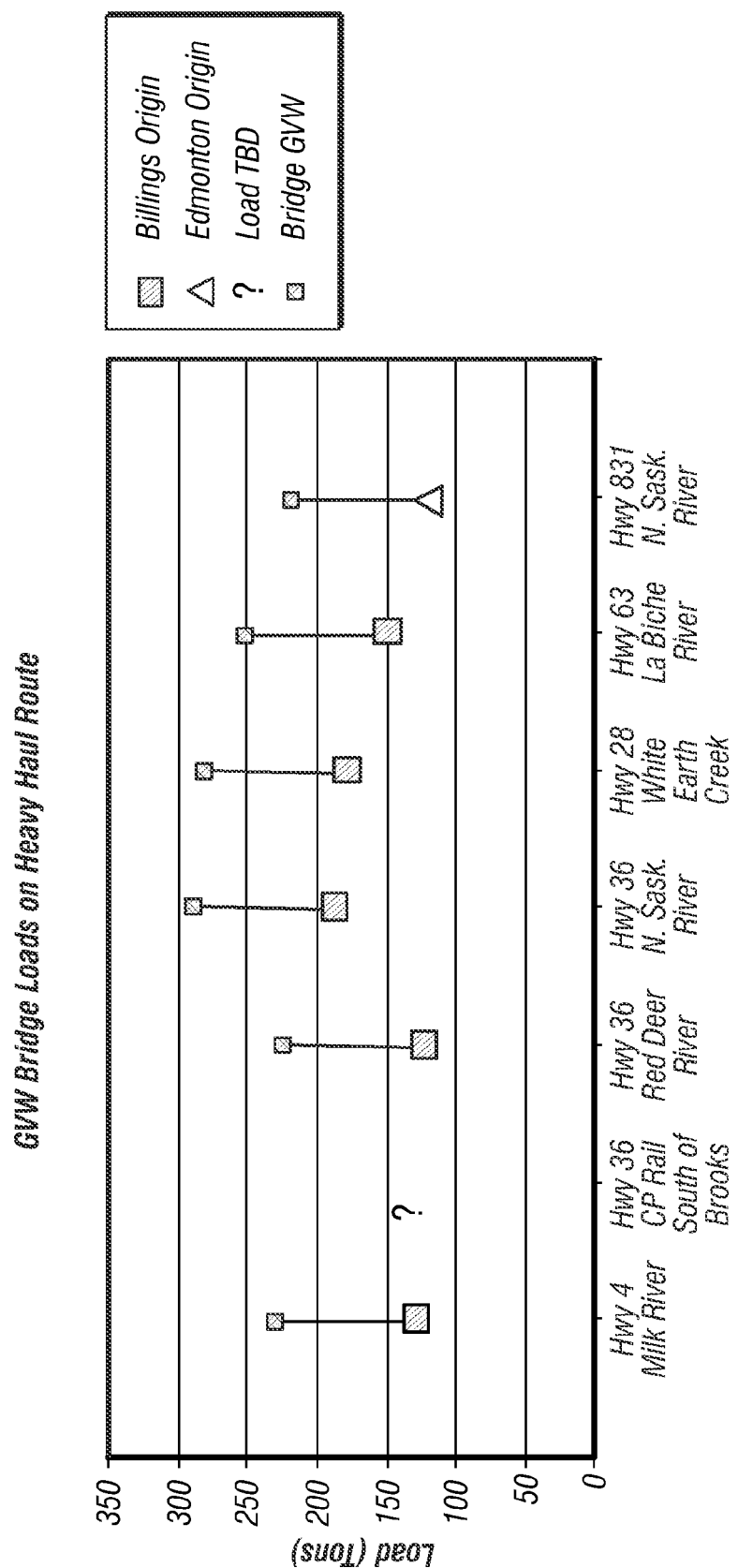
FIG. 13 illustrates bridge loads on a heavy-haul route.

Furthermore, certain bridges on a heavy haul route may have certain gross vehicle weight (GVW) limits, as may be seen in the Alberta route embodiment of FIG. 13. Visual depiction of a route in a simplified chart may assist various parties involved in heavy hauling, such as the large-sized module manufacturer, heavy transportation company, processing plant owner, and governmental transportation departments, in evaluating the suitability of a given route for transportation of large-sized modules and other loads. For example, in transporting a large-sized module from Billings, Mont. to Edmonton, Canada or Fort McMurray, Canada, or from Edmonton, Canada to Fort McMurray, Canada, the large-sized module may need to be hauled across one or more bridges. Each bridge along the route should be identified, and its GVW rating evaluated for its capability to support transportation of the large-sized module. For example, the bridge on Hwy 36 over the North Saskatchewan River may be GVW-rated at just under 300 tons. A maximum large-sized module weight may be calculated by subtracting from the GVW rating the tare, or unloaded weight of tractor and trailer. For that bridge, the large-sized module load, if being transported from Billings Mont., may be just under 200 tons.

A route planner may evaluate the maximum tonnage that a given route may sustain, and identify any bridges for which information is not available or has not yet been obtained. In some embodiments, the GVW rating of the weakest bridge may limit the maximum large-sized module weight on a given route, even if other bridges on that route may safely allow transportation of greater loads. In some embodiments, the loaded tractor-trailer GVW may be less than the bridge GVW rating to provide a margin of safety. Also, some bridge surfaces may be less smooth than others, and may result in some bouncing of the load as it crosses, thus requiring a larger margin of safety for dynamic bridge loading. For such bridges, it may be desirable to travel at an even more reduced rate, such as at 2-3 mph. Furthermore, the center of gravity and load concentration of a module may limit a trailer payload.

In some embodiments, using scale weights rather than estimated weights may allow for a greater payload because of increased confidence in the actual payload weight. Furthermore, in some embodiments, to spread out a load over a greater bridge area, a longer trailer having more axles and more space between each axle group may allow a greater payload. For shorter bridges, for example, a trailer may be sufficiently long that only one axle set at a time is actually on the bridge while traveling over, thus allowing a load weighing overall greater than the bridge's GVW rating to be transported over the bridge. And, traveling down the center of a bridge, rather than in the normal driving lane, may allow a bridge to sustain transportation of a heavier load.

Figure 14:
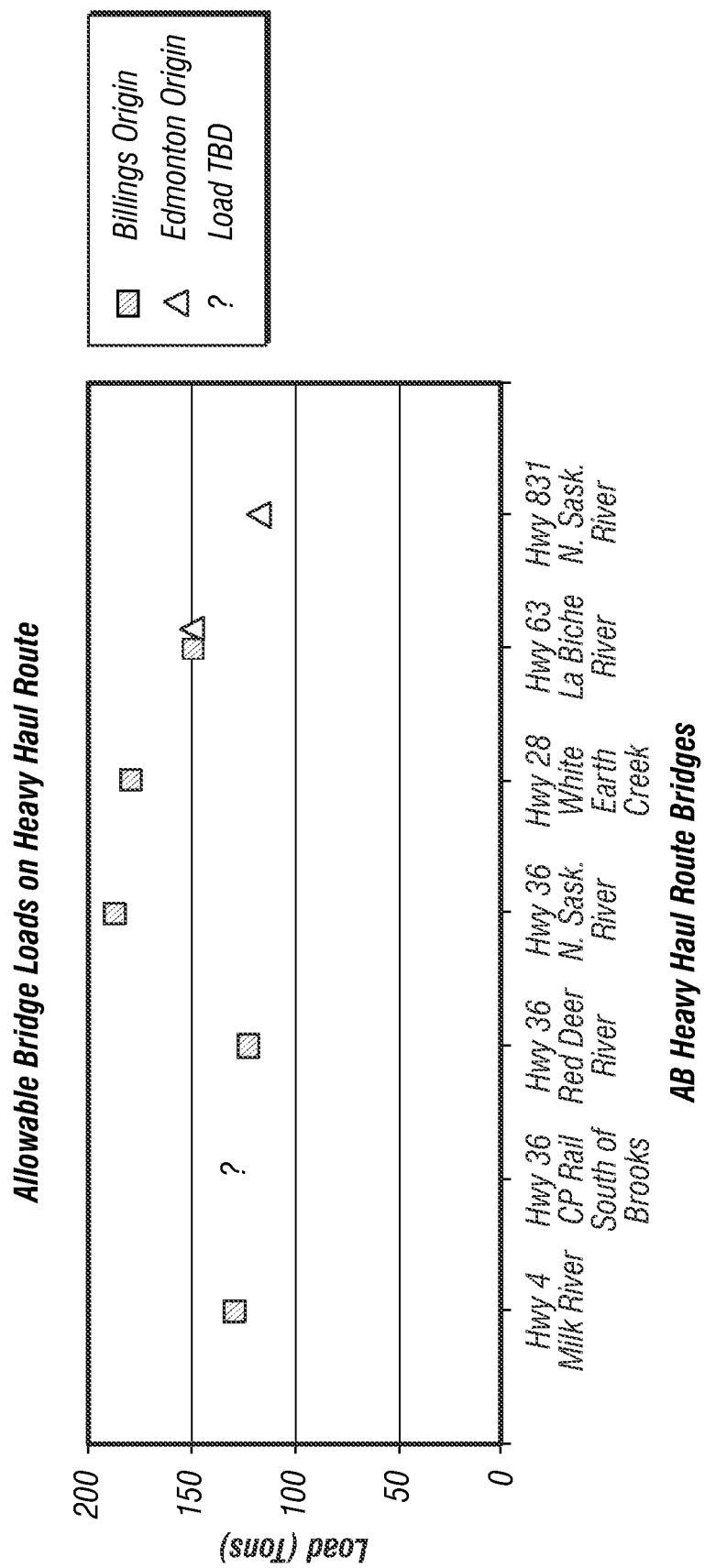
FIG. 14 illustrates allowable bridge loads on a heavy-haul route.

Thus, a route planner may calculate the large-sized module load that each bridge on a route may sustain, as may be seen in the exemplary allowable bridge loading chart of FIG. 14. Such a chart may provide a ready visual representation of maximum weight limits over the route.

Figure 15:
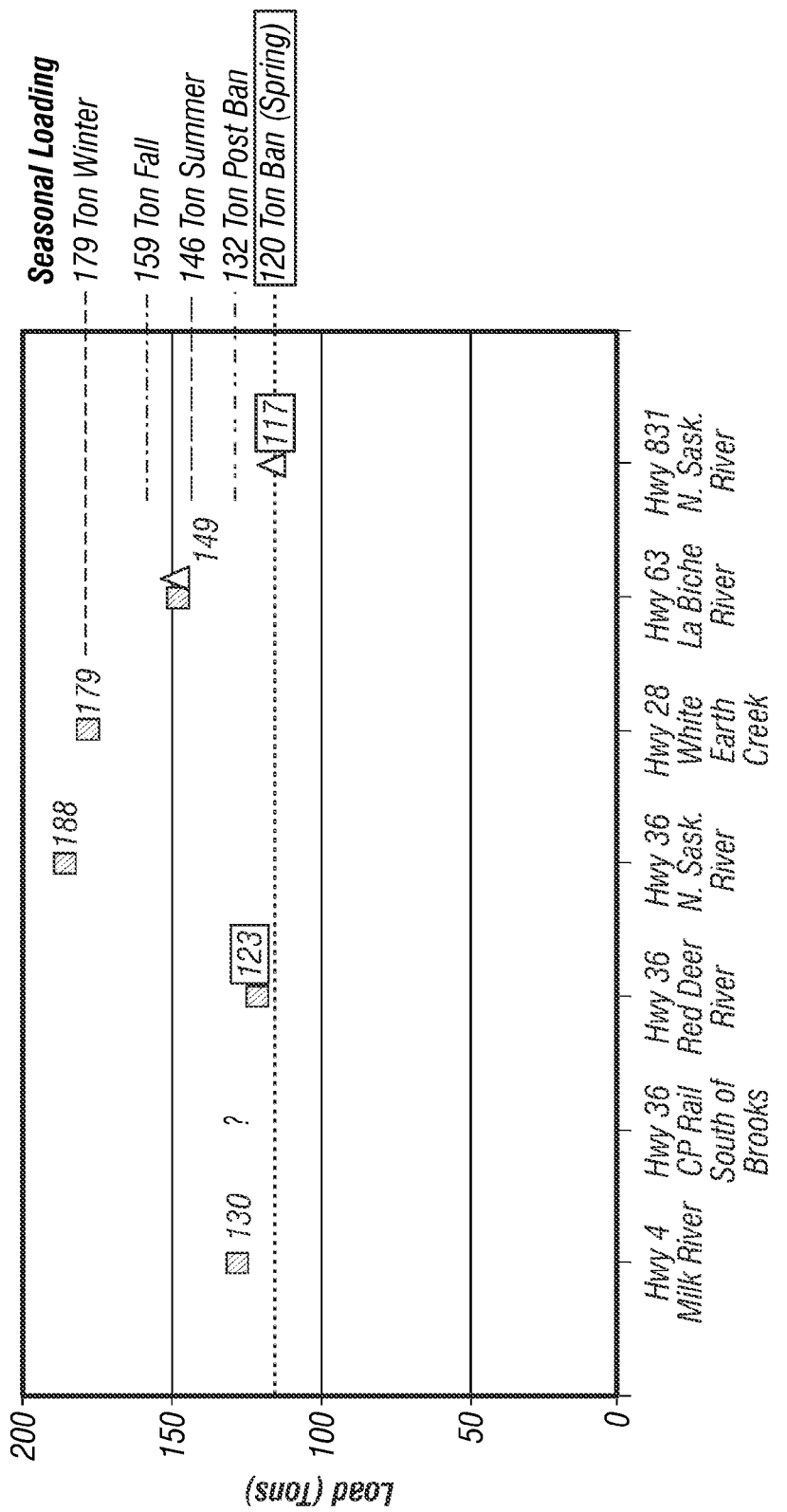
FIG. 15 illustrates allowable bridge loads on a heavy-haul route by season.

Furthermore, exemplary allowable bridge and pavement loads by season may be visually depicted, as may be seen in the embodiment of FIG. 15. Seasonal limits may further limit the maximum load that a given route may sustain.

Figure 16:
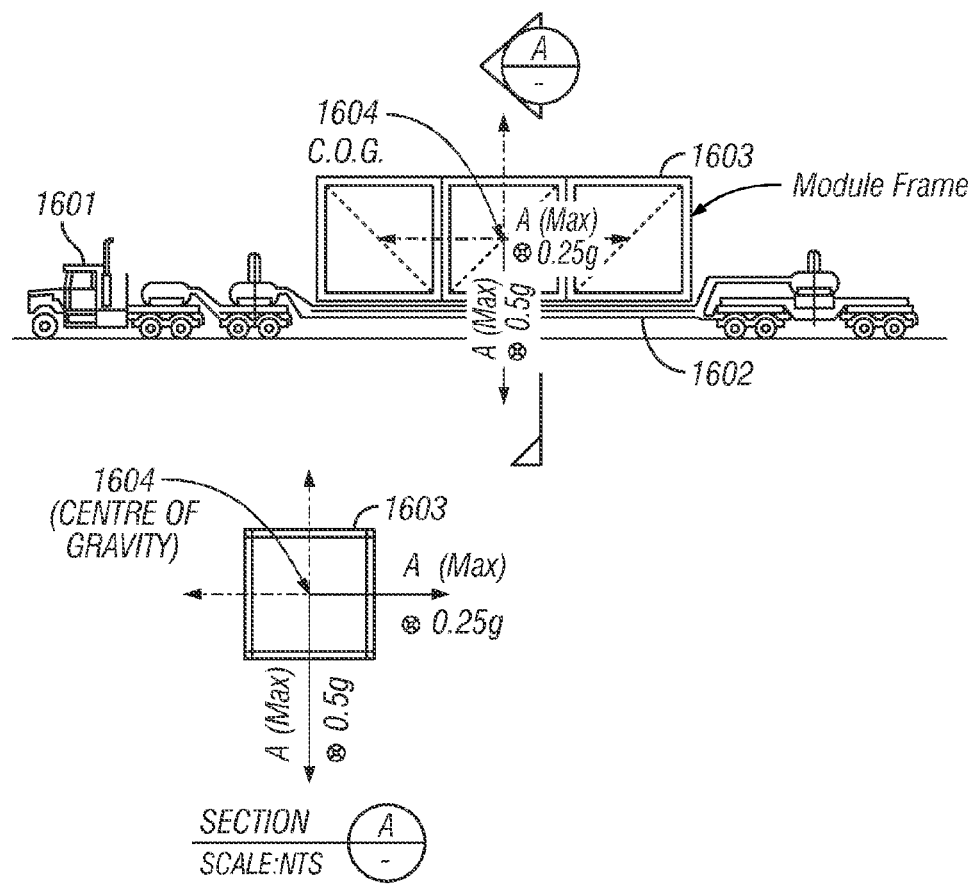
FIG. 16 illustrates exemplary acceleration and deceleration limits of a tractor-trailer loaded with a large-sized module.

Module transportation may be subject to acceleration and deceleration limits. As may be seen in the embodiment of FIG. 16, a tractor 1601 may pull a trailer 1602 loaded with a large-sized module 1603. Acceleration and deceleration in the direction of travel may be limited to no more than one fourth of the gravitational constant (32.2 ft/sec$^2$), or approximately 8 ft/sec$^2$. In the vertical direction, acceleration and deceleration may be limited to no more than one-half of the gravitational constant. Lateral acceleration and deceleration may be limited, as well. It may be important to ensure that the load center of gravity 1604 coincides with the payload center of the trailers on which it is loaded. Excessive acceleration and deceleration, ascending or descending gradients, curves, other road tilt and wind power may cause the load center to move away from the trailer payload center, thus increasing the risk that the trailer and load will tip over. Limiting acceleration and deceleration, including travel around curves, and up and down hills, can help prevent the centers of gravity from moving out of alignment.

Heavy-Haul Transportation Logistics System

Figure 17:
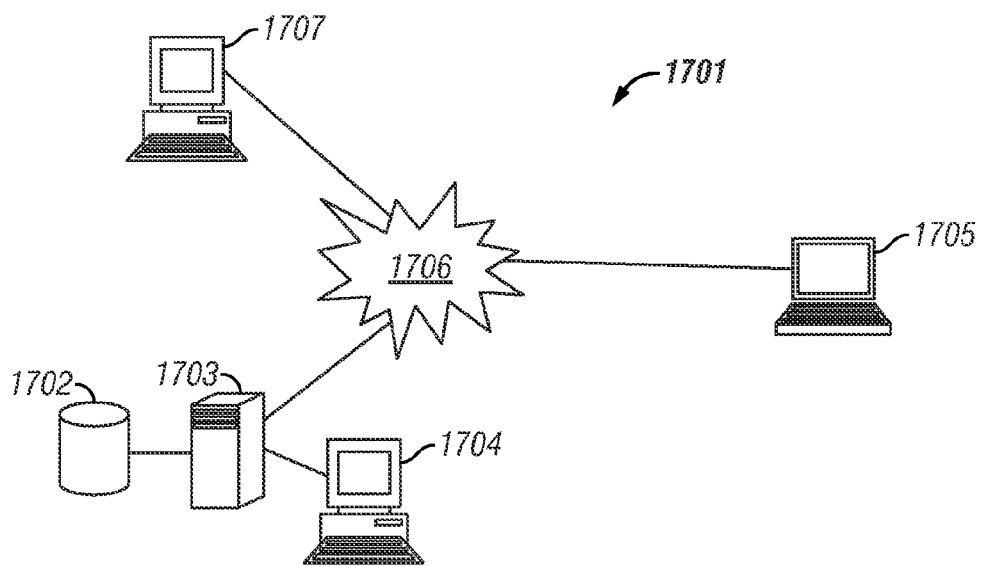
FIG. 17 illustrates an exemplary heavy-haul transportation logistics system.

An embodiment of a system for heavy hauling supply chain logistics 1701 may be provided, as illustrated in FIG. 17. A database 1702 having route information such as that noted above may communicate with a server 1703 running a route engineering software application. The database 1702 may be a part of the server 1703, and may be managed by through an administrative client computer 1704. A route planner may drive along various roads, and use a laptop computer 1705 to communicate with the server 1703 and database 1702 via a communications network 1706 to identify, confirm and/or update road conditions, and to store various heavy haul routes in the database 1702. For example, a route planner may identify or confirm bridge attributes, and update a database table such as illustrated in the embodiment of FIG. 18. In that embodiment, attributes such as bridge length and rail height may be considered. Other parties that may need access to route information, such as a transportation company's regulation compliance officer, may access the database via client 1707 computer over the network, as well. For example, a route planner may note various road hazards, turn distances, traffic signals, bridge GVW limits and other items of interest. During transportation of a large-sized module, alternate routes may be determined on the fly if the planned route proves unworkable due, for example, to unexpected environmental conditions or traffic accidents.

Figure 19:
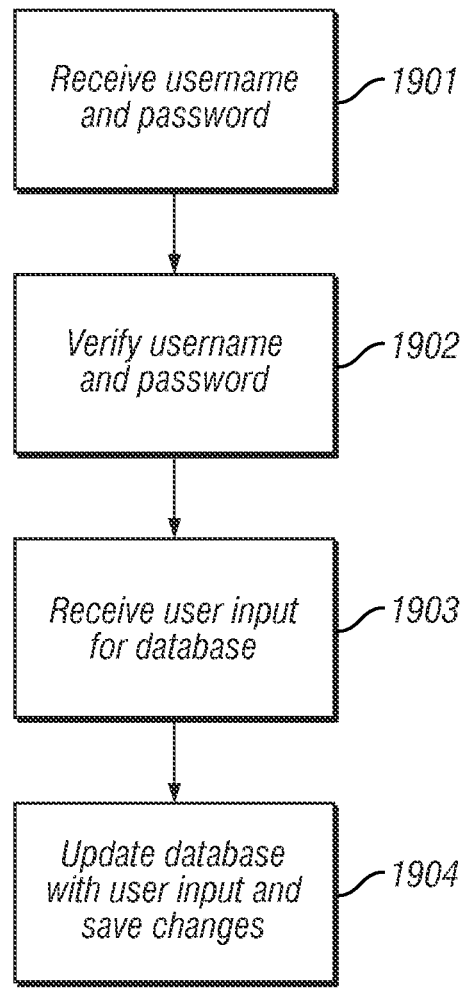
FIG. 19 illustrates an exemplary method for updating a transportation logistics database.
Figure 20A:
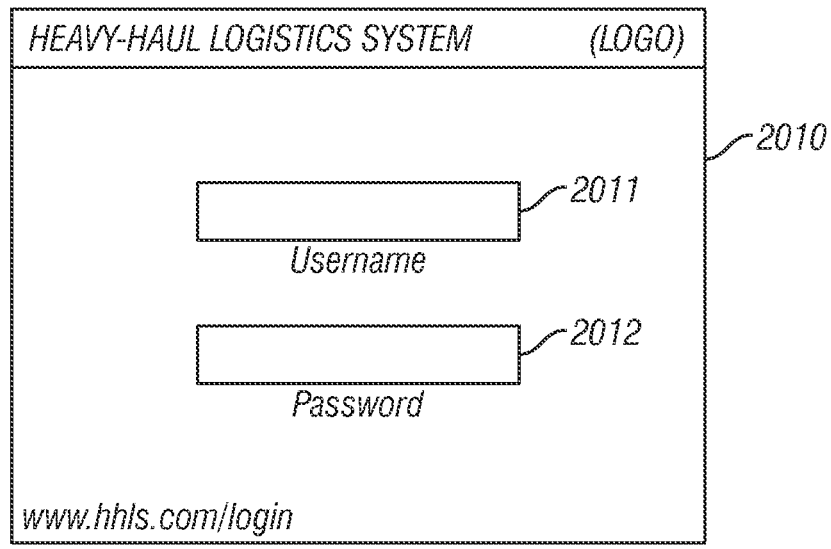
Figure 20B:
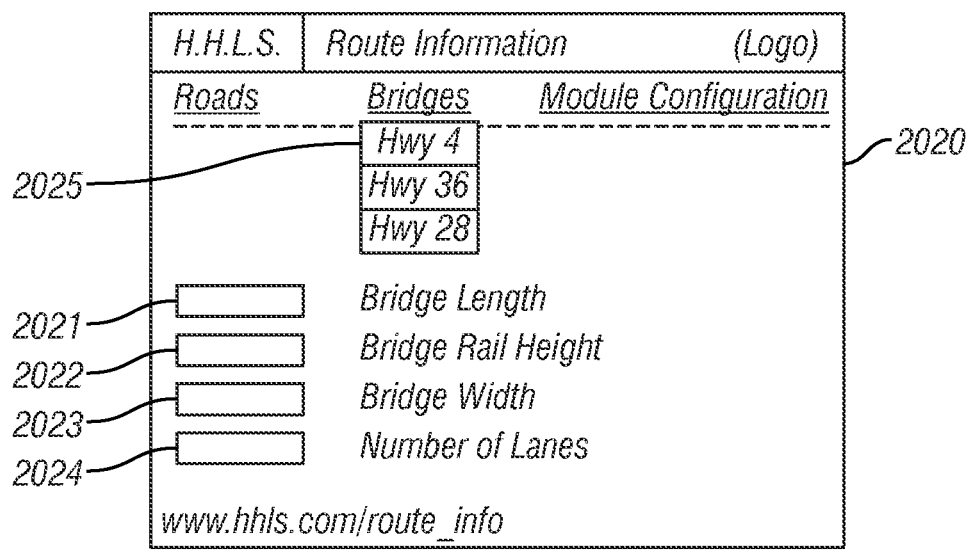

In an embodiment, the route engineering software application may be provided as a server-side application accessible via a client computer. The application may operate according to the flowchart of FIG. 19. As may be seen in FIG. 19, the application may allow a user to update and/or populate a database with route information, such as road conditions and transportation guidelines. In step 1901, the application receives a user's username and password. A graphical user interface, such as the login screen 2010 illustrated in FIG. 20A that prompts a user to enter a user ID and password in fields 2011 and 2012, may be provided for this step. In step 1902, the user's ID and password may be verified, thus providing the user with access to the database. In step 1903, the applications may allow a user to interactively review and input data. The user may be provided with a screen 2020, such as that illustrated in FIG. 20B, with fields 2021, 2022, 2023, and 2024 for inputting bridge length, bridge rail height, bridge width and number of lanes on the bridge, and/or drop-down menus 2025 that allow the user to review and input route information. In step 1904, the application may update the database and save the changes.

Figures 20E, 21:
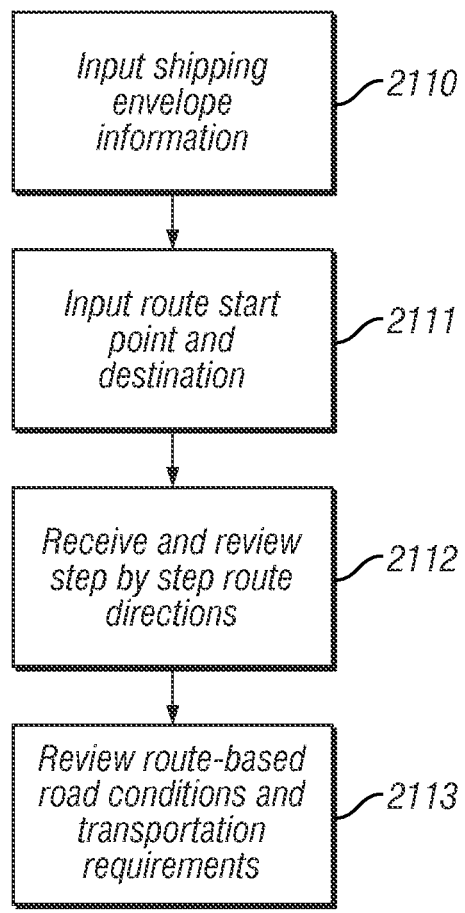

In an embodiment, a user may use the route engineering software application for assistance in determining one or more optimal routes for module transportation. An optimal route may be one that minimizes travel time, does not have excessive gradients, minimizes traffic disruptions, requires that relatively few traffic signals be used, avoids densely populated areas, and/or the like, for a module. As seen in the exemplary process of FIG. 21, in step 2110, a user may input module shipping envelope information, such as the shipping envelope of a tractor-trailer loaded with a large-sized module weighing 100 tons, via a screen 2030 such as that illustrated in FIG. 20C. In step 2111, the user may input the route start point and route end destination via a screen 2040 such as that illustrated in FIG. 20D. For example, the route may start at a fabrication yard in Billings, Mont., and end at a plant site near Ft. McMurray in Alberta, Canada. In step 2112, the user may review a step-by-step direction list and/or visual map of route options that may be suitable for transportation of that particular module. In one embodiment, a direction list or map may be provided via a screen 2050 such as that illustrated in FIG. 20E. In one embodiment, an optimal route may be emphasized on a map. In step 2113, the user may review route-based road conditions and transportation requirements, such as whether a permit would be required for the particular load, whether a pilot car would be required, where traffic lights are, and the like.

Figure 22:
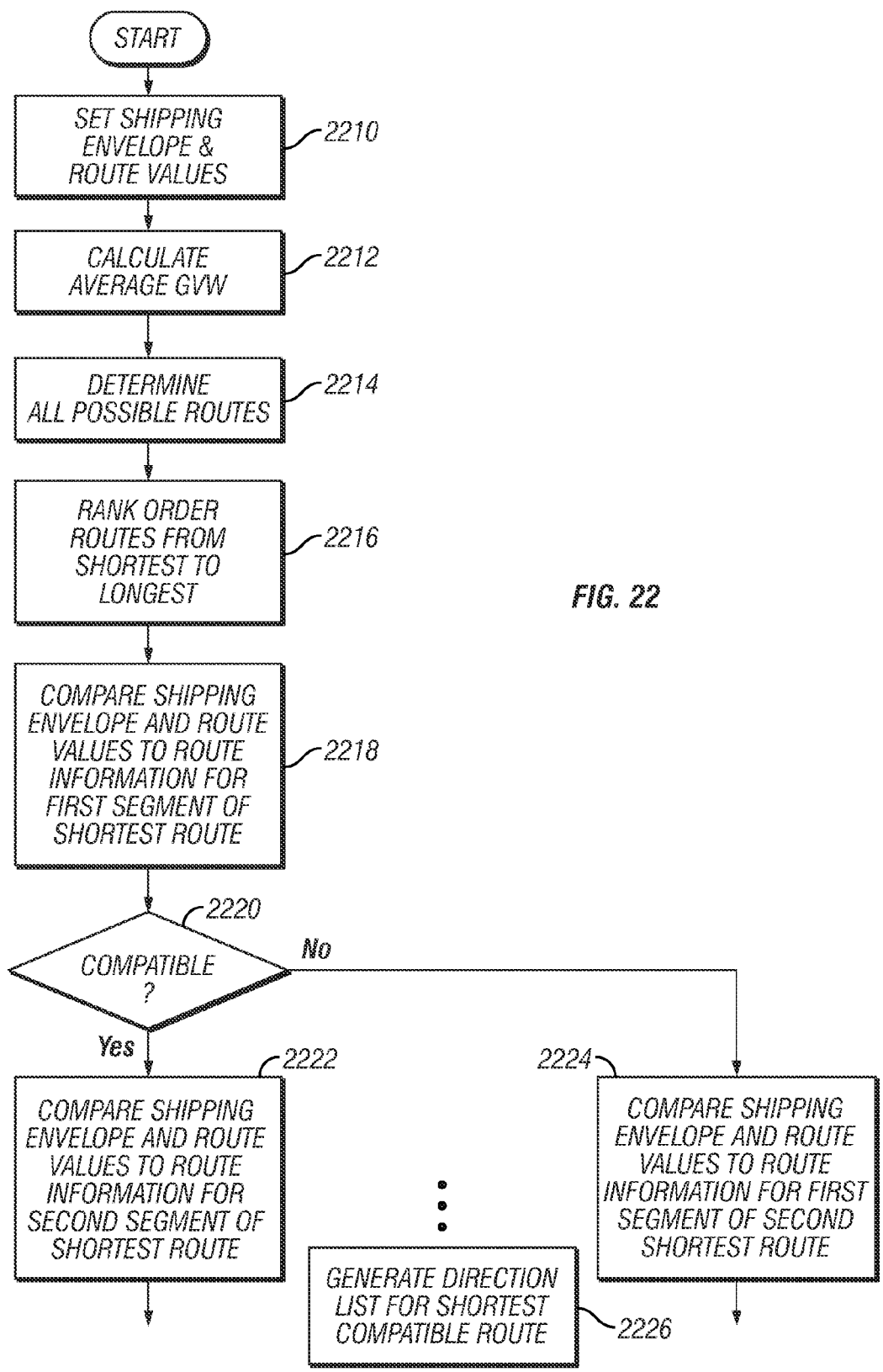
FIG. 22 illustrates an exemplary algorithm for determining suitable large-module shipping routes.

In one embodiment, the application may use an algorithm such as that depicted in FIG. 22, to determine an optimal route for a module. In step 2210, module shipping envelope values and route information values may be set based on information input by the user. Such shipping envelope values may include a length value, a width value, a height value, an overall_weight value, a trailer_weight value, a trailer_axle_count value, a trailer_axle_distance value, a route_start value, and a route_end value, among other values. The length value may represent the overall length of a tractor-trailer with payload. The width value may represent the overall width of the tractor-trailer with payload. The height value may represent the overall height of the tractor-trailer with payload. The trailer_weight value may represent the weight of the trailer with payload. The trailer_axle_count value may represent a single axle or a set of axles. The trailer_axle_distance value may represent the horizontal distance between individual axles or between axle sets. The route_start value may represent a physical starting location for payload transportation. The route_end value may represent a physical ending location or payload destination.

In step 2212, an average_GVW value may be calculated by dividing the trailer_weight value by the trailer_axle_count value. The application may allow a user to set an actual GVW for a given axle or axle set instead of allowing the algorithm to calculate an average GVW. A user may desire to input an axle GVW value of a load has a center of gravity that does not coincide with the load's dimensional center.

In step 2214, all possible routes may be determined between the route_start value and the route_end value. In step 2216, all possible routes may be rank-ordered from shortest route to longest route. In one embodiment, Dijkstra's algorithm or some variant thereof may be used to calculate the shortest route, the second shortest route, the third shortest route, etc. In one embodiment, a route segment may be defined at each end by a route node. Each intersection in a network of roads may be deemed a route node and given a value to allow route determination. Other route nodes may include, for example, the route_start value, route_end value, each end of a bridge. Thus, a network of roads may be modeled as a network of route nodes. If the shortest route is desired, each road segment may be weighted according to its length, e.g., the shorter the road, the greater the segment is weighted. The shortest route may be determined by starting with the route_start value, determining the closest node to define a first route segment, determining the next closest node to determine a second route segment. The shortest route may be determined by the series of road segments summing to the greatest weight. Alternatively, the shortest route may comprise the road segments between the route_start node and the route_end node having the shortest summed length.

In step 2218, the shortest route may be evaluated for suitability for transportation of a given module within the specified shipping envelope by comparing values such as the length value, width value, height value, overall_weight value, average_GVW value against the route infatuation for the first route segment, i.e., the route segment defined at one end by the route_start node (first node) and defined at the other end by the by the next route node (second node) along the route. In step 2220, if the comparison returns a positive value for the first route segment, i.e., the load is compatible with the first route segment, then the second route segment may be similarly compared in step 2222. The second route segment may be defined by the second route node and the next route node (third node) along the route. If that comparison returns a positive value, then the third route segment may be similarly compared, then the fourth route segment, and so forth until either all route segments return a positive value, or until a negative value is returned. For example, a negative value may be returned if a bridge along the route is not rated to carry the load, i.e., the load is incompatible with the route segment that includes the bridge.

If a comparison returns a negative value for a route segment, then the second shortest route is evaluated at step 2224, starting with the first route segment of the second shortest route, then the second route segment, and so forth until each suitable route is determined. After each suitable route is determined, at step 2226 the application may provide the user with a visual indication of the shortest qualifying route, or generate a list of directions for that route, such as according to the screen 2050 of FIG. 20E. Alternatively, the application may first display on the user's screen the shortest route compatible the shipping envelope requirements, and make the other compatible routes available via drop-down menu. The route may then be printed, transmitted to a governmental permitting office via email, or otherwise shared.

The route engineering software application may rely on commercially available mapping software, such as Google Maps, or Telenav software, for basic route information, such as intersection-to-intersection mileage, and may overlay heavy hauling route info nation from a database to further specify an optimal route.

Any suitable mobile computer, such as a laptop, cell phone, PDA or other suitable device, may be used to communicate with the database and server. Various functions and aspects of embodiments of this disclosure may be implemented in hardware, software, or a combination of both, and may include multiple processors. A processor is understood to be a device and/or set of machine-readable instructions for performing various tasks. A processor may include various combinations of hardware, firmware, and/or software. A processor acts upon stored and/or received information by computing, manipulating, analyzing, modifying, converting, or transmitting information for use by an executable procedure or an information device, and/or by routing the information to an output device. For example, a processor may use or include the capabilities of a controller or a microprocessor, or it may be implemented in a personal computer configuration, as a workstation, or in a server configuration.

Further, various conventionally known data storage and memory devices, for example, cache memory, may also be used in the computer-implemented system and method of this disclosure, as may conventional communications and network components. Network configurations may include wired local area network (LAN), wireless network topologies (WLAN), the interne, or cellular communication networks, for example.

Implementations of the foregoing system may be implemented in digital electronic circuitry, or in computer software, firmware, or hardware, including the structures disclosed in this specification and their structural equivalents, or in combinations of one or more of them. Implementations of the foregoing system may be implemented as one or more computer program products, i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A database may be of any suitable type, such as a relational database.

A computer program (also known as a program, software, software application, script, or code) may be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes, algorithms and logic flows described in this specification may be performed by one or more programmable processors executing one or more computer programs to perform functions by operating on input data and generating output. The processes and logic flows may also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data may include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the foregoing system may be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices may be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the foregoing system may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. As noted above, examples of communication networks include a local area network ("LAN") and a wide area network ("WAN"), e.g., the Internet.

The computing system may include clients and servers. A client and server may generally be remote from each other and may typically interact through a communication network. The relationship of client and server may arise by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Thus, particular implementations have been described. Other implementations are within the scope of the following claims.

We claim:

1. A transportation logistics system for supplying modules to a hydrocarbon processing plant site comprising:
    a server connected to a network, said server comprising executable route engineering software;
    a database accessible by said server, said database comprising transportation logistics information and department of transportation regulations information regarding movement on public road of assembled, large-sized modules, said assembled, large-sized modules measuring between about 22 ft to about 24 ft wide×about 22 ft to about 25½ ft high×about 85 ft to about 120 ft long, said transportation logistics information comprising shipping envelope information for the assembled, large-sized modules; and
    a mobile first client computer capable of communication with said server via said network, said mobile first client computer being adapted to provide a graphical user interface configured to allow updating of said transportation logistics information with real-time information pertaining to land routes complying with the department of transportation regulations;
    wherein said route engineering software application is configured to accept the shipping envelope information, a route start point and a route end point, and, utilizing said updated transportation logistics information, to calculate travel route options complying with the department of transportation regulations;
    wherein said route engineering software application is further configured to compare the calculated travel route options to determine at least one of: which of the calculated travel route options will result in the shortest travel time, which of the calculated travel route options will result in the least fuel usage, which of the calculated travel route options will result in the fewest traffic disruptions, and which of the calculated travel route options has the least number of traffic signals; and
    provide said determined at least one option to a user.

2. The system of claim 1, wherein said transportation logistics information comprises at least one of a bridge GVW limit, a bridge width, a bridge rail height, a seasonal transportation pavement GVW weight limit, an overhead traffic signal height, an overhead traffic signal location, an overhead utility line height, an overhead utility line location, a road underpass location, a road underpass height, a road gradient, an acceleration and deceleration limit, a railroad crossing, a road name, a road length, a flag car requirement, a heavy-load signage requirement, a refueling location, a speed limit, and a load lighting requirement.

3. The system of claim 1, wherein said shipping envelope information further comprises at least one of a length value, a width value, a height value, an overall weight value, a trailer weight value, a trailer axle count value, and a trailer axle distance value.

4. The system of claim 1, wherein said route engineering software application provides at least one calculated route option for display using a commercially available mapping software.

5. The system of claim 4, wherein said route engineering software application provides said at least one calculated route option to said mobile first client computer for display using the graphical user interface.

6. The system of claim 1, wherein said route engineering software application is configured to treat each road intersection of a calculated travel route option as a unique route node and wherein a travel route between two route nodes of the calculated travel route option comprises a travel route segment.

7. The system of claim 6, wherein said route engineering software is configured to calculate a total calculated travel route option distance by combining the length of each said travel route segment in said calculated travel route option.

8. The system of claim 7, wherein said route engineering software is configured to determine a shortest travel route by comparing said total travel route distance of a first calculated travel route option with the total travel route distance of a second travel route option.

9. The system of claim 8, wherein said route engineering software is configured to compare each said travel route segment with the shipping envelope information to determine if said travel route segment is compatible with said shipping envelope information.

10. A non-transitory computer-readable medium containing program instructions for determining a travel route to a hydrocarbon processing plant site, wherein execution of the program instructions by one or more processors of a computer system causes the one or more processors to carry out the steps of:
    accessing a memory containing transportation logistics information and department of transportation regulations information regarding movement on public road of assembled, large-sized modules, said assembled, large-sized modules measuring between about 22 ft to about 24 ft wide×about 22 ft to about 25½ ft high×about 85 ft to about 120 ft long, said transportation logistics information comprising shipping envelope information for the assembled, large-sized modules; and
    based on the shipping envelope information and the department of transportation regulations information, calculating travel route options between a route start point and a route end point that comply with the department of transportation regulations;
    comparing the calculated travel route options to determine at least one of: which of the calculated travel route options will result in the shortest travel time, which of the calculated travel route options will result in the least fuel usage, which of the calculated travel route options will result in the fewest traffic disruptions, and which of the calculated travel route options has the least number of traffic signals; and
    provide said determined at least one option to a user.

* * * * *

UNITED STATES PATENT AND TRADEMARK OFFICE
CERTIFICATE OF CORRECTION

PATENT NO. : 8,428,870 B2
APPLICATION NO. : 13/334954
DATED : April 23, 2013
INVENTOR(S) : Allen L. Berry et al.

Page 1 of 1

It is certified that error appears in the above-identified patent and that said Letters Patent is hereby corrected as shown below:

In the Specification

In column 8, line 65, replace "providing" with --provide--;
In column 16, line 18, replace "infatuation" with --information--;
In column 16, line 21, delete "by the", 1st occurrence;
In column 17, line 11, replace "interne" with --internet--.

Signed and Sealed this
Eighteenth Day of June, 2013

Teresa Stanek Rea
*Acting Director of the United States Patent and Trademark Office*